(12) United States Patent
Kakeda et al.

(10) Patent No.: US 8,863,139 B2
(45) Date of Patent: Oct. 14, 2014

(54) MANAGEMENT SYSTEM AND MANAGEMENT METHOD FOR MANAGING A PLURALITY OF STORAGE SUBSYSTEMS

(75) Inventors: Tomoaki Kakeda, Yokohama (JP); Takato Kusama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 239 days.

(21) Appl. No.: 13/139,872

(22) PCT Filed: Apr. 12, 2011

(86) PCT No.: PCT/JP2011/059064
§ 371 (c)(1),
(2), (4) Date: Jun. 15, 2011

(87) PCT Pub. No.: WO2012/140730
PCT Pub. Date: Oct. 18, 2012

(65) Prior Publication Data
US 2012/0266177 A1    Oct. 18, 2012

(51) Int. Cl.
| | | |
|---|---|---|
| G06F 9/50 | (2006.01) | |
| G06F 3/00 | (2006.01) | |
| G06F 3/06 | (2006.01) | |
| G06F 11/34 | (2006.01) | |
| H04L 29/08 | (2006.01) | |

(52) U.S. Cl.
CPC ............. *G06F 3/0632* (2013.01); *G06F 3/067* (2013.01); *G06F 3/0665* (2013.01); *G06F 3/061* (2013.01); *G06F 11/3433* (2013.01); *H04L 67/1097* (2013.01)
USPC .... 718/104; 715/700; 711/114; 711/E12.001; 711/118; 718/1; 718/105

(58) Field of Classification Search
CPC ..... G06F 3/067; G06F 3/0653; G06F 3/0647; G06F 11/3452; G06F 11/3433; G06F 2212/601; G06F 13/00; G06F 2201/885; G06F 9/00
USPC .......... 711/114, 170, E12.001, 118; 718/104, 718/1, 105; 715/700, 771
See application file for complete search history.

(56) References Cited

U.S. PATENT DOCUMENTS 5,581,724 A * 12/1996 Belsan et al. ................ 711/114
6,529,995 B1 * 3/2003 Shepherd ...................... 711/114
(Continued)

FOREIGN PATENT DOCUMENTS

JP          2004206623 A    7/2004
JP          2007299256 A   11/2007
(Continued)

*Primary Examiner* — Sanjiv Shah
*Assistant Examiner* — Edward Waddy, Jr.
(74) *Attorney, Agent, or Firm* — Volpe and Koenig, P.C.

(57) ABSTRACT

The present invention provides a technique capable of improving use efficiency of storage devices. In this regard, a computer system of the present invention includes: a plurality of storage subsystems; an information processing apparatus coupled to the storage subsystems and including a virtual layer for virtually providing information from the storage subsystems; and the a management system that manages the plurality of storage subsystems and the information processing apparatus. The management system manages, on a memory, configuration information of logical volumes allocated to virtual instances managed on a virtual layer of the information processing apparatus and operation information of hardware resources included in the storage subsystems. The management system evaluates use efficiency of the virtual instances based on the configuration information of the logical volumes and the operation information of the hardware resources and outputs an evaluation result.

17 Claims, 18 Drawing Sheets

(56) References Cited

U.S. PATENT DOCUMENTS

| | | | |
|---|---|---|---|
| 8,250,390 B2* | 8/2012 | Takada et al. | 713/320 |
| 8,281,068 B2* | 10/2012 | Kono et al. | 711/114 |
| 2002/0194251 A1* | 12/2002 | Richter et al. | 709/105 |
| 2003/0061362 A1* | 3/2003 | Qiu et al. | 709/229 |
| 2004/0133707 A1* | 7/2004 | Yoshiya et al. | 710/6 |
| 2005/0119996 A1* | 6/2005 | Ohata et al. | 707/3 |
| 2007/0079099 A1* | 4/2007 | Eguchi | 711/170 |
| 2007/0255922 A1 | 11/2007 | Toume et al. | |
| 2008/0225858 A1* | 9/2008 | Sato et al. | 370/395.7 |
| 2009/0235269 A1* | 9/2009 | Nakajima et al. | 718/104 |
| 2009/0249018 A1* | 10/2009 | Nojima et al. | 711/170 |
| 2010/0023566 A1 | 1/2010 | Minamino et al. | |
| 2010/0191908 A1* | 7/2010 | Yamakawa | 711/114 |
| 2012/0221729 A1* | 8/2012 | Hara et al. | 709/226 |

FOREIGN PATENT DOCUMENTS

| | | |
|---|---|---|
| JP | 2009238114 A | 10/2009 |
| JP | 201026919 A | 2/2010 |

\* cited by examiner

| Auxiliary Storage Device ID | RAID Group ID | Capacity | Drive Type |
|---|---|---|---|
| 1 | RG1 | 400GB | SAS |
| 2 | RG1 | 400GB | SAS |
| 3 | RG1 | 400GB | SAS |
| 4 | RG1 | 400GB | SAS |
| 5 |  | 500GB | SATA |

Figure 4

| Volume ID | RAID Group ID | Capacity | Storage Pool ID | Storage Port | Allocation Destination ID | Target ID | Virtual Logical Volume Expansion Logical Volume ID |
|---|---|---|---|---|---|---|---|
| 1 | RG1 | 1200GB | 1 | - | - | - | - |
| V1 | - | 700GB | 1 | 10.01.00.00.00.00.00.01 | 10.10.00.00.00.00.00.00 | 1 | 4 |
|   |   |   |   |   |   |   | 5 |
| V2 | - | 800GB | 1 | 10.01.00.00.00.00.00.01 | 10.10.00.00.00.00.00.00 | 2 | 2 |
|   |   |   |   |   |   |   | 3 |

| Storage Pool ID (0501) | Logical Volume ID (0502) | Port (0503) | External Connection Location (0504) |
|---|---|---|---|
| 1 | 1 | - | - |
| 1 | 2 | 10.01.00.00.00.00.00.00 | 10.02.00.00.00.00.00.00 |
| 1 | 3 | 10.01.00.00.00.00.00.00 | 10.02.00.00.00.00.00.00 |
| 1 | 4 | 10.01.00.00.00.00.00.00 | 10.03.00.00.00.00.00.00 |
| 1 | 5 | 10.01.00.00.00.00.00.00 | 10.03.00.00.00.00.00.00 |

| Page ID (0601) | Virtual Logical Volume ID (0602) | Logical Volume ID (0603) | Allocation Date/Time (0604) |
|---|---|---|---|
| 1 | V1 | 4 | 2011/01/04 9:00 |
| 2 | V1 | 5 | 2011/01/04 9:05 |
| 3 | V2 | 2 | 2011/01/05 10:00 |
| 4 | V2 | 3 | 2011/01/05 11:00 |
| 5 | V2 | 3 | 2011/01/05 11:00 |
| 6 | - | 1 | - |

| Storage Resource Type | Resource ID | Performance Type | Performance Value | Period | Date/Time |
|---|---|---|---|---|---|
| CPU | - | Busy Rate | 40% | Hourly | 2011/01/05 12:00 |
| CPU | - | Spec | 800MHz | Hourly | 2011/01/05 12:00 |
| Cache | - | Hit Rate | 40% | Hourly | 2011/01/05 12:00 |
| Cache | - | Spec | 32GB | Hourly | 2011/01/05 12:00 |
| Raid Group | RG1 | Busy Rate | 80% | Hourly | 2011/01/05 12:00 |
| Volume | V1 | Random / Sequential Ratio | 80%/20% | Hourly | 2011/01/05 12:00 |
| Volume | V2 | Random / Sequential Ratio | 30%/70% | Hourly | 2011/01/05 12:00 |

Figure 9

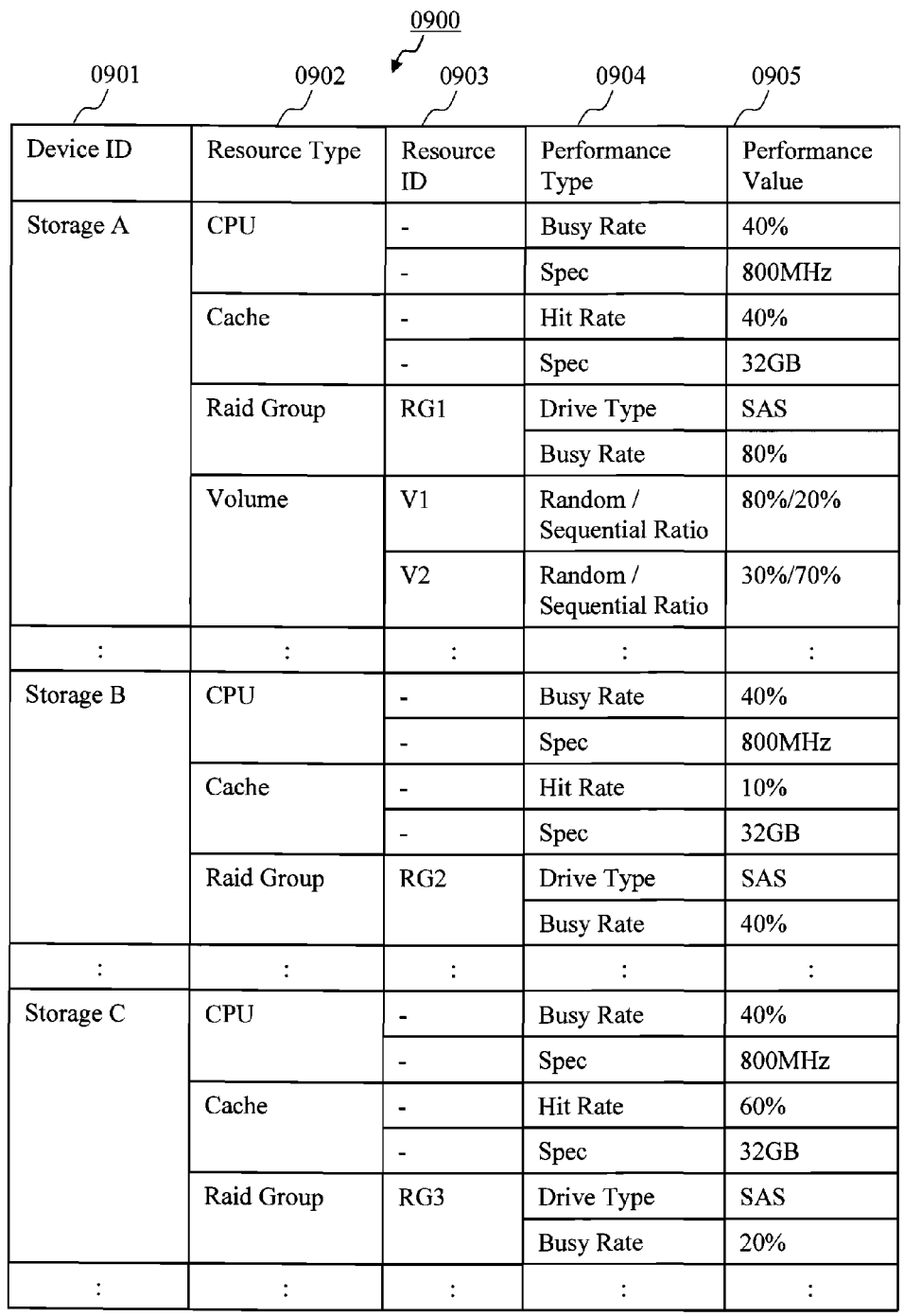

| Device ID | Resource Type | Resource ID | Performance Type | Performance Value |
|---|---|---|---|---|
| Storage A | CPU | - | Busy Rate | 40% |
| | | - | Spec | 800MHz |
| | Cache | - | Hit Rate | 40% |
| | | - | Spec | 32GB |
| | Raid Group | RG1 | Drive Type | SAS |
| | | | Busy Rate | 80% |
| | Volume | V1 | Random / Sequential Ratio | 80%/20% |
| | | V2 | Random / Sequential Ratio | 30%/70% |
| : | : | : | : | : |
| Storage B | CPU | - | Busy Rate | 40% |
| | | - | Spec | 800MHz |
| | Cache | - | Hit Rate | 10% |
| | | - | Spec | 32GB |
| | Raid Group | RG2 | Drive Type | SAS |
| | | | Busy Rate | 40% |
| : | : | : | : | : |
| Storage C | CPU | - | Busy Rate | 40% |
| | | - | Spec | 800MHz |
| | Cache | - | Hit Rate | 60% |
| | | - | Spec | 32GB |
| | Raid Group | RG3 | Drive Type | SAS |
| | | | Busy Rate | 20% |
| : | : | : | : | : |

| Logical Volume ID | Storage Device ID | RAID Group |
|---|---|---|
| 1 | Storage A | RG1 |
| 2 | Storage B | RG2 |
| 3 | Storage B | RG2 |
| 4 | Storage C | RG3 |
| 5 | Storage C | RG3 |

| Storage Device ID | Volume ID | Allocation Source | Allocation Destination | Target ID | Pool Management Table ID (Record ID) |
|---|---|---|---|---|---|
| Storage A | V1 | 10.01.00.00.00.00.00.01 | 10.10.00.00.00.00.00.00 | 1 | - |
| Storage A | V2 | 10.01.00.00.00.00.00.01 | 10.10.00.00.00.00.00.00 | 2 | - |
| Storage B | 2 | 10.02.00.00.00.00.00.00 | 10.01.00.00.00.00.00.00 | 2 | 2 |
| Storage B | 3 | 10.02.00.00.00.00.00.00 | 10.01.00.00.00.00.00.00 | 3 | 3 |
| Storage C | 4 | 10.03.00.00.00.00.00.00 | 10.01.00.00.00.00.00.00 | 4 | 4 |
| Storage C | 5 | 01.03.00.00.00.00.00.00 | 10.01.00.00.00.00.00.00 | 5 | 5 |

| Virtual Logical Volume ID | Pool ID | Storage Device ID | Storage Location Storage Device | Evaluation Value | Logical Volume ID | Volume Evaluation Value |
|---|---|---|---|---|---|---|
| V1 | 1 | Storage A | Storage A | 35 | 1 | 0 |
| | | | Storage B | 40 | 2 | 20 |
| | | | | | 3 | 20 |
| | | | Storage C | 30 | 4 | 50 |
| | | | | | 5 | 50 |
| V2 | 1 | Storage A | Storage A | 40 | 1 | 5 |
| | | | Storage B | 60 | 2 | 20 |
| | | | | | 3 | 20 |
| | | | Storage C | 20 | 4 | 40 |
| | | | | | 5 | 40 |

Access Characteristics

| Host | Volume | Pool | Random/Seaquantial | Read/Write Characteristics |
|---|---|---|---|---|
| Host A | V1 | 1 | Random Characteristics | Write Characteristics |
| | V2 | 1 | Sequential Characteristics | Read Characteristics |

[Edit]

Storage Location Definition

| Volume | Priority Allocation Destination Volume (Evaluation Result) | Current Storage Location Volume |
|---|---|---|
| V1 | Storage C, Volume 4/5 | Storage C, Volume 4/5 |
| V2 | Storage B, Volume 2/3 | (Storage B, Volume 2/3), (Storage C, Volume 4/5) |

[Edit]

Pool Details
Pool: 1@Storage A ▼

Pool Configuration Logical Volume: (Current Configuration Information)

| Storage | Processor | | Cache | | Volume | Drive Busy Rate |
|---|---|---|---|---|---|---|
| | Spec | Busy Rate | Size | Hit Rate | | |
| Storage A | 800MHz | 40% | 32GB | 40% | 1 | 80% |
| Storage B | 800MHz | 40% | 32GB | 10% | 2 | 40% |
| | | | | | 3 | 40% |
| Storage C | 800MHz | 40% | 32GB | 60% | 4 | 20% |
| | | | | | 5 | 20% |

MANAGEMENT SYSTEM AND MANAGEMENT METHOD FOR MANAGING A PLURALITY OF STORAGE SUBSYSTEMS

TECHNICAL FIELD

The present invention relates to a management system, a computer system including the management system, and a management method, and for example, relates to a technique for managing a storage location of data in a computer system to which a plurality of storage devices (also called "storage subsystems") are connected (coupled).

BACKGROUND ART

In an environment in which a host and a storage device are connected (coupled), a technique for controlling an I/O request from the host according to the load of the storage device is developed. For example, Patent Literature 1 discloses returning an error to an I/O request from the host if the system load of the storage device is excessive and causing the host to retry the I/O request. More specifically, in Patent Literature 1, when the load of a specific RAID logical unit (hereinafter, called "RAID group") is predicted to be high, access to the RAID group is prevented to improve the use efficiency of the RAID group. Therefore, a controller storage device in the system predicts the load of the RAID group based on the I/O request to an externally connected storage device and based on the state of the response to prevent access to the RAID group, in which the load is determined to be high, to improve the use efficiency of the RAID group.

CITATION LIST

Patent Literature

Patent Literature 1: JP Patent Publication (Kokai) No. 2004-206623A

SUMMARY OF INVENTION

Technical Problem

In a conventional technique as described in Patent Literature 1, storage capacities of the externally connected storage devices are virtually handled as the same storage devices, and the load of the RAID groups of the external storage devices is taken into account to control the response to the I/O request. However, spec information and performance information of the hardware of the externally connected storage devices are not taken into account at all when the response to the I/O request is controlled. Therefore, the load state of various pieces of hardware in the external storage devices and the I/O characteristics (also called "access pattern") to the storage devices are not taken into account in the control for the I/O request. As a result, the load may vary in each externally connected storage device, and data may be stored in a device not suitable for the I/O characteristics.

Therefore, it is desirable to arrange the data in appropriate external storage devices according to the load states of the externally connected storage devices and the I/O characteristics to the storage devices. The storage device uses a plurality of pieces of hardware, such as a processor, a cache, and a RAID group, to return the response to the I/O request. Therefore, whether the I/O request can be responded with expected performance cannot be determined even if only the load of the RAID group is taken into consideration, unless the load of other pieces of hardware are taken into account. For example, the storage device can return the response based on the information of the cache if reading accesses for certain data are continued within a short period. In this case, the storage device can return a significantly quick response without imposing a load on the RAID group. In Patent Literature 1, although the load of the RAID group is determined to be low as a result of the quick response, the load of the RAID group may be actually high. In that case, since the load of the RAID group is considered to be low, the I/O request is issued to the RAID group instead of preventing the I/O request. As a result, the response performance to the I/O request is degraded.

The present invention has been made in view of the circumstances, and the present invention provides a technique for improving use efficiency of storage devices by improving response performance to an I/O request.

Solution to Problem

To solve the problems, the present invention includes: a plurality of storage subsystems; an information processing apparatus connected to the storage subsystems and including a virtual layer for virtually providing information from the storage subsystems; and a management system that manages the plurality of storage subsystems and the information processing apparatus. The management system manages, on a memory, configuration information of logical volumes allocated to virtual instances managed on the virtual layer of the information processing apparatus and operation information of hardware resources included in the storage subsystems. The management system evaluates use efficiency of the virtual instances based on the configuration information of the logical volumes and the operation information of the hardware resources and outputs an evaluation result.

Further features related to the present invention will become apparent from the description of the present specification and the attached drawings. Modes of the present invention are attained and realized by elements and various combinations of the elements as well as by the following detailed description and modes of the attached claims.

The description of the present specification is only a typical illustration, and it needs to be understood that the description does not limit the claims or applications of the present invention in any sense.

Advantageous Effects of Invention

According to the present invention, use efficiency of storage devices can be improved.

BRIEF DESCRIPTION OF DRAWINGS

FIG. 3 is a diagram showing an example of configuration of a RAID group management table.

FIG. 4 is a diagram showing an example of configuration of a volume management table.

FIG. 5 is a diagram showing an example of configuration of a storage pool configuration table.

FIG. 6 is a diagram showing an example of configuration of a page configuration table.

FIG. 9 is a diagram showing an example of configuration of a resource performance table on the management server.

FIG. 10 is a diagram showing an example of configuration of a logical volume management table on the management server.

FIG. 11 is a diagram showing an example of configuration of a path management table on the management server.

FIG. 13 is a diagram showing an example of configuration of a virtual logical volume management table on the management server.

FIG. 19 is a diagram showing an example of a GUI screen for checking and editing arrangement location information.

DESCRIPTION OF EMBODIMENTS

Figure 1:
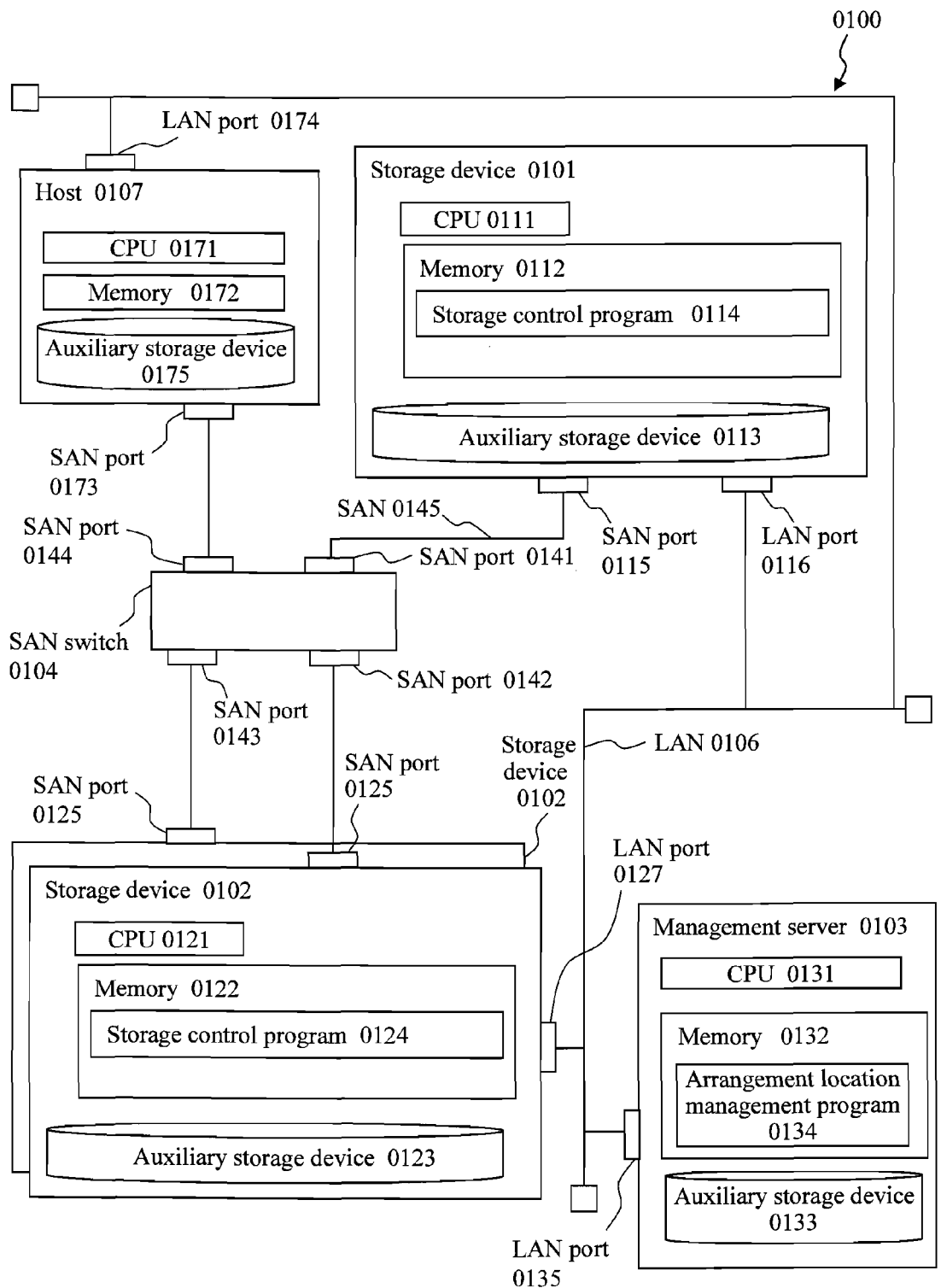
FIG. 1 is a diagram showing a schematic configuration of a computer system according to a first embodiment of the present invention.

Hereinafter, embodiments of the present invention will be described with reference to the attached drawings. In the attached drawings, functionally the same elements may be displayed by the same reference numerals. Although the attached drawings illustrate specific embodiments and examples of implementation according to the principle of the present invention, the attached drawings are for the understanding of the present invention and are not used to restrictively interpret the present invention.

Although the present embodiments describe the present invention in detail enough for those skilled in the art to carry out the present invention, other implementations and modes are also possible, and it needs to be understood that changes in configurations and structures as well as replacements of various elements are possible without departing from the range and the spirit of the technical concept of the present invention. Therefore, the following description should not be interpreted restrictively.

Furthermore, as described below, the embodiments of the present invention may be implemented by software operated on a general-purpose computer, or may be implemented by dedicated hardware or a combination of software and hardware.

Although information of the present invention will be described in "table" formats in the following description, the information does not have to be expressed by data structures based on tables, and the information may be expressed by data structures, such as a list, a DB, and a queue, or by other ways. Therefore, the "table", the "list", the "DB", the "queue", and the like may be simply called "information" to indicate independence from the data structure.

Expressions, such as "identification information", "identifier", "name", "name", and "ID", can be used to describe the content of the information, and the expressions can replace each other.

Although a "program" serves as a subject (operational entity) to describe processes in the embodiments of the present invention, the program is executed by a processor to execute a predetermined process while using a memory and a communication port (communication control apparatus). Therefore, the processor may serve as a subject in the description. A process disclosed with the program serving as the subject may be a process executed by a computer or information processing apparatus such as a management server. Part or the entire program may be realized by dedicated hardware or may be modularized. Various programs may be installed on computers through a program distribution server or storage media.

(1) First Embodiment

The present embodiment discloses a mode of using a storage pool established on a controller storage device, the mode being a virtual technique for intensively managing storage areas across a plurality of externally connected storage devices. The controller storage device denotes a storage device with a function of virtually handling a plurality of storage devices as the same storage devices. The externally connected storage devices denote storage devices handled as the same storage devices connected to the controller storage device. A computer system in which the controller storage device virtually handles the plurality of externally connected storage devices as the same storage devices can be called a storage virtualization system. The storage pool in the present embodiment is created from volumes allocated from the plurality of externally connected storage devices or from volumes of the controller storage device, and the storage pool has a function of providing virtual volumes to a host (host computer).

<Configuration of Computer System>

FIG. 1 is a diagram showing an overall schematic configuration of a computer system according to a first embodiment. A computer system 0100 includes a storage device 0101 as a controller storage device, at least one storage device 0102 as an externally connected storage device, a management server (management computer) 0103, at least one host (host computer) 0107, and a SAN (Storage Area Network) switch 0104. The controller storage device 0101 and the host 0107 are connected by a SAN 0145 through the SAN switch 0104. The storage devices 0101 and 0102, the management server 0103, and the host 0107 are connected by a LAN (Local Area Network) 0106.

(i) Controller Storage Device 0101

The controller storage device 0101 includes a SAN port 0115 and a LAN port 0116. The controller storage device 0101 is connected to the SAN 0145 by the SAN port 0115 and connected to the LAN 0106 by the LAN port 0116. The controller storage device 0101 includes a CPU 0111, a memory 0112, and at least one auxiliary storage device 0113. The CPU 0111 executes a storage control program 0114 stored in the memory 0112 to execute various processes. The controller storage device 0101 has a function of showing, to the host 0107, volumes in the externally connected storage device 0102 as volumes provided by the controller storage device 0101.

The memory 0112 stores the storage control program 0114 and information necessary for the CPU 0111 to execute the storage control program 0114. For example, the storage control program 0114 executes a process of establishing logical volumes logically provided from the storage devices. Details will be described with reference to FIG. 2.

The auxiliary storage device 0113 provides areas handled as storage areas by the storage control program 0114 as described later. Although FIG. 1 includes one auxiliary storage device 0113, the number of the auxiliary storage device 0113 is not limited to one. FIG. 1 may include a plurality of auxiliary storage devices. Examples of the auxiliary storage device 0113 include an FC (Fibre Channel) disk and an SSD (Solid State Drive).

The controller storage device can be called a controller storage subsystem.

(ii) Externally Connected Storage Device 0102

The constituent elements are substantially the same as in the controller storage device 0101, and the description will not be repeated. The difference between the controller storage device 0101 and the externally connected storage device is that the controller storage device has a function of providing, to the host 0107, the volumes in the externally connected storage device as the volumes of the controller storage device as described above.

The externally connected storage device can be called an externally connected storage subsystem or simply a storage subsystem.

(iii) Management Server 0103

The management server 0103 includes a CPU (processor) 0131, a memory 0132, and an auxiliary storage device 0133. The management server 0103 includes a LAN port 0135 and is connected to the LAN 0106 by the LAN port 0135.

The CPU 0131 executes an arrangement location management program 0134 stored in the memory 0132 to execute various processes.

The memory 0132 stores the arrangement location management program 0134 and information necessary for the CPU 0131 to execute the arrangement location management program 0134. Details of the information and program in the memory 0132 will be described with reference to FIG. 3.

The auxiliary storage device 0133 stores information collected and managed by the arrangement location management program 0134.

The arrangement location management program 0134 has a function of collecting information from the controller storage device 0101, the externally connected storage device 0102, and the host 0107 and a function of determining and notifying an arrangement location of data based on the collected information. Details of the arrangement location management program 0134 will be described later.

Although not shown, the management server 0103 includes an input device and a display device (output device). In place of the input/output devices, a serial interface or an Ethernet interface may serve as the input/output devices. A computer for display including a display, a keyboard, or a pointer device may be connected to the interface to transmit information for display to the computer for display and receive information for input from the computer for display. In this way, the display and the reception of input by the computer for display may replace the input and the display by the input/output devices.

Hereinafter, a set of one or more computers that manage the storage devices 0101 and 0102 and that display the information for display of the present invention may be called a management system. The management server 0103 serves as the management system when the management server (management computer) 0103 displays the information for display, and a combination of the management server 0103 and the computer for display also serves as the management system. A plurality of computers may realize similar processes as the management server for faster and more reliable management processing, and in this case, the plurality of computers (including the computer for display when the computer for display performs the display) serves as the management system.

(iv) Host 0107

The host 0107 includes a CPU 0171 and a memory 0172. The host 0107 further includes a SAN port 0173 and is connected to the SAN 0145 by a SAN port 0144. The host 0107 further includes a LAN port 0174 and is connected to the LAN 0106 by a LAN port 0174.

The host 0107 uses, as storage areas, volumes provided by an auxiliary storage device 0175 and the storage device 0101 through the SAN 0145.

Although FIG. 1 includes one host 0107, the number of the host 0107 is not limited to one. FIG. 1 may include a plurality of hosts 0107.

(v) SAN Switch 0104

The SAN switch 0104 is a network device that relays data communication between the controller storage device 0101, the externally connected storage device 0102, and the host 0107. The SAN switch 0104 includes SAN ports 0141 to 0144.

Although the SAN 0145 in the computer system 0100 includes one SAN switch 0104, the number of the SAN switch 0104 is not limited to one. The SAN 0145 may include a plurality of SAN switches 0104. The devices may be connected by the SAN 0145 without the arrangement of the SAN switch 0104.

<Example of Configuration of Logical Storage Areas>

Figure 2:
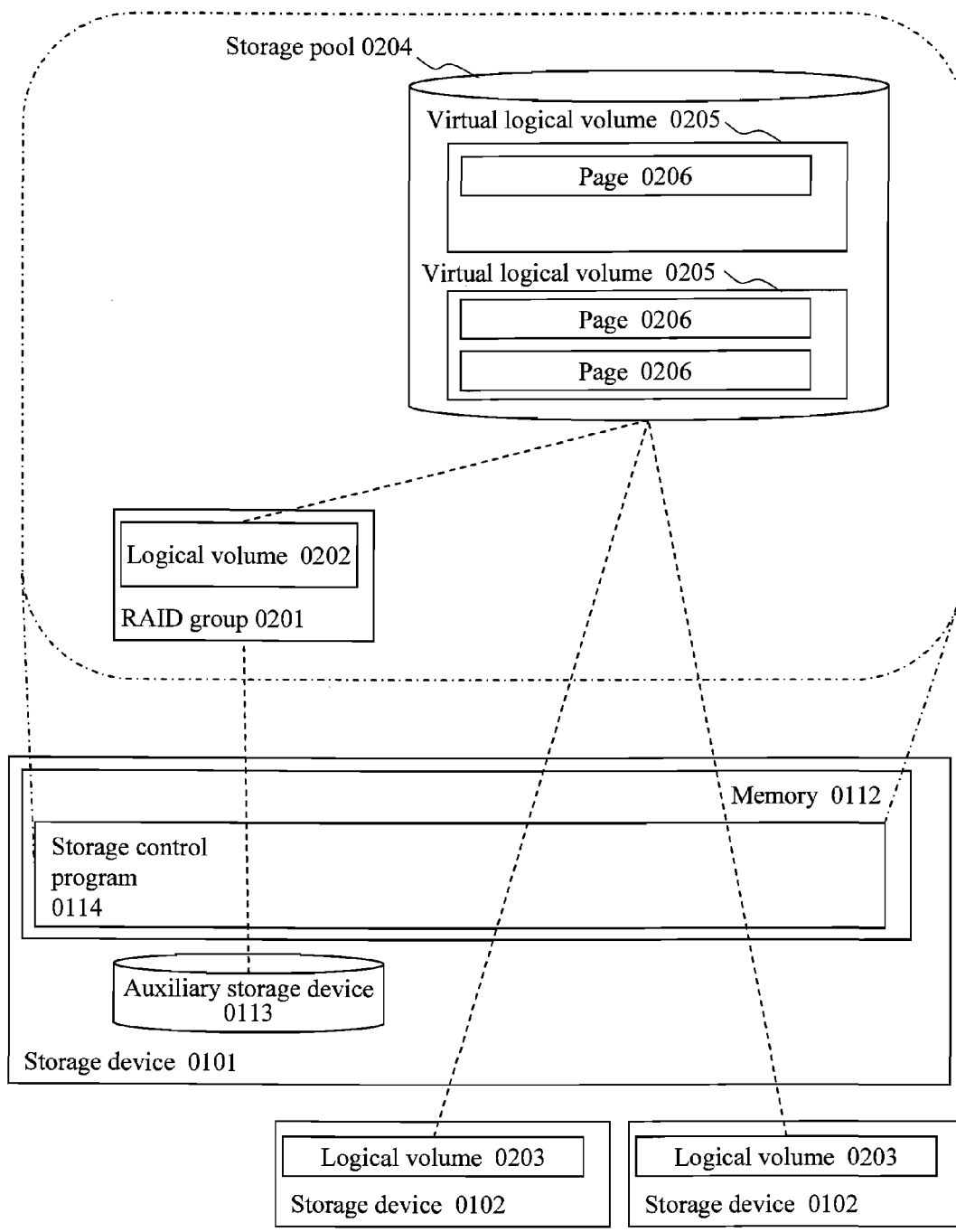
FIG. 2 is a diagram showing an example of logical configuration of storage devices.

FIG. 2 is a diagram schematically showing logical storage areas provided by the controller storage device 0101. More specifically, FIG. 2 virtually depicts a role of the controller storage device. According to the function, even if a plurality of externally connected storage devices 0102 are installed, the host 0107 recognizes only the controller storage device 0101. Hereinafter, details of the logical storage areas and the storage control program 0114 will be described first, and then management information stored in the memory 0112 to manage the logical storage areas will be described in detail.

(i) Logical Storage Areas and Storage Control Program 0114

The storage control program 0114 has a function of establishing logical storage areas from a plurality of auxiliary storage devices (the auxiliary storage device 0113 of the controller storage device and the auxiliary storage device 0123 of at least one externally connected storage device 0102). For example, the storage control program 0114 can establish logical storage areas, such as a RAID group 0201, a logical volume 0202, a storage pool 0204, and virtual logical volumes 0205. Hereinafter, the logical storage areas will be described in detail.

The RAID group 0201 is a logical storage area constituted by a plurality of auxiliary storage devices 0113, i.e. RAID (Redundant Arrays of Inexpensive Disks), and is established by the storage control program 0114. For example, when the storage control program 0114 receives, as input parameters, an instruction indicating in which one of the plurality of auxiliary storage devices 0133 the RAID group will be established and an instruction of the RAID level from the management server 0103, the storage control program 0114 can establish the RAID group 0201 in the RAID level designated from the auxiliary storage device 0113. There are various sizes of RAID groups, and the sizes can be mixed and set.

The logical volume 0202 is a logical storage area in the RAID group 0201 and is established by the storage control program 0114. For example, when the storage control program 0114 receives, as input values, the RAID group 0201 of a creation source and the size of the logical volume 0202 to be created from the management server 0103, the storage control program 0114 can establish the logical volume 0202 in the size designated from the designated RAID group 0201.

The storage pool 0204 is a logical storage area constituted by a plurality of logical volumes 0202 and is established by the storage control program 0114. For example, when the storage control program 0114 receives, as input values, the plurality of logical volumes 0202 that should constitute the pool from the management server 0103, the storage control program 0114 can establish the storage pool 0204 from the designated plurality of logical volumes 0202. Other than the logical volumes 0202 on the storage device 0101 storing the storage control program 0114, the storage pool 0204 can be established by logical volumes 0203 allocated from the storage devices 0102 through the SAN 0145.

Pages 0206 are one or a plurality of logical storage areas constituted by the storage pool 0204 and are established by the storage control program 0114. For example, when the storage control program 0114 receives, as an input value, the size of the pages 0206 created from the management server 0103 (can be variably set in each page), the storage control program 0114 can create the designated pages 0206 from the storage pool 0204. The data stored in the pages 0206 is stored in the logical volumes 0202 constituting the storage pool or in the logical volumes 0203 through the storage pool 0204 constituting the pages.

The virtual logical volumes 0205 are logical storage areas established from a plurality of pages by the storage control program 0114 and are disclosed to the host 0107 as virtual volumes with capacities greater than the actual capacities. For example, when the storage control program 0114 receives, as input values, the capacities of the virtual logical volumes 0205 from the management server 0103, the storage control program 0114 can establish the virtual logical volumes 0205 with the capacities designated from the plurality of pages 0206. The storage control program 0114 can disclose, to the host 0107, the virtual logical volumes 0205 as volumes with the capacities greater than the actual capacities of the virtual logical volumes and can further allocate one or a plurality of pages 0206 to the virtual logical volumes 0205 according to a Write command from the host 0107.

(ii) Functions of Storage Control Program

Functions provided by the storage control program 0114 will be described. The storage control program 0114 provides a function of constituting the logical storage areas (logical storage area configuration function), a function of allocating the logical volume 0202 and the virtual logical volumes 0205 to the host (logical volume allocation function), a function of allocating the pages 0206 to the virtual logical volumes 0205 according to an I/O command from the device that has allocated the volumes (virtual logical volume expansion function), a function of designating possible pages to be allocated during the virtual logical volume expansion in advance (virtual logical volume expansion policy designation function), and a function of periodically collecting performance information of storage resources (performance information collection function).

The storage control program 0114 stores the management information related to the functions in the memory 0112 to manage the information. In response to a request from the management server 0103, the storage control program 0114 sends out the management information to the storage devices and the host. The request from the management server 0103 can be requested, for example, to the storage control program 0114 through the LAN 0106.

<Example of Configuration of Management Information>

Hereinafter, the management information stored in the memory 0112 of the controller storage device 0101 will be described. The storage control program 0114 stores the following five tables in the memory 0112 to manage the logical storage areas.

(i) RAID Group Management Table (FIG. 3)

FIG. 3 is a diagram showing an example of configuration of a RAID group management table 0300 storing information of the RAID group 0201. The RAID group management table 0300 includes, as configuration items, auxiliary storage device ID 0301, RAID group ID 0302, capacity 0303, and drive type 0304.

The auxiliary storage device ID 0301 is information for uniquely specifying and identifying the auxiliary storage devices 0113 that constitute the RAID groups 0201. The RAID group ID 0302 is information for uniquely specifying and identifying the RAID groups 0201. The capacity 0303 is information indicating the capacities of the auxiliary storage devices 0113 constituting the corresponding RAID groups 0201. The drive type 0304 is information indicating the drive types of the auxiliary storage devices 0113 constituting the corresponding RAID groups 0201. Examples of the drive type include SATA and SSD in addition to SAS.

If the RAID group is not formed yet, the RAID group ID 0302 is blank.

It can be recognized from FIG. 3 that a RAID group 1 (RG 1) has a capacity of 1600 GB as a whole.

(ii) Volume Management Table (FIG. 4)

FIG. 4 is a diagram showing an example of configuration of a volume management table 0400 storing information of the logical volumes 0202 and the virtual logical volumes 0205. The volume management table 0400 includes, as configuration items, volume ID 0401, RAID group ID 0402, capacity 0403, storage pool ID 0404, storage port 0405, allocation destination ID 0406, target ID 0407, and virtual logical volume expansion logical volume ID 0408.

The volume ID 0401 is information for uniquely specifying and identifying the logical volumes 0202 or the virtual logical volumes 0205. In FIG. 4, the volumes from the controller storage device 0101 are indicated by normal numbers (for example "1"), and the volumes from the externally connected storage device 0102 are indicated by V1, V2, and so forth.

The RAID group ID 0402 is information for uniquely specifying and identifying the RAID groups 0201 as generation sources of the logical volumes 0202 or the virtual logical volumes 0205. In the example of FIG. 4, the volumes V1 and V2 correspond to virtual logical volumes and do not constitute the RAID group. Therefore, the RAID group ID 0402 is "NA".

The capacity 0403 is information indicating the capacities of the corresponding volumes. The storage pool ID 0404 is information for uniquely specifying and identifying the storage pool 0204 to which the corresponding volumes belong. The storage port 0405 is information for uniquely specifying and identifying the ports of the storage devices disclosing the corresponding volumes.

The allocation destination ID 0406 is information for uniquely specifying and identifying the allocation destinations of the volumes. WWN (World Wide Name) may be stored as information for uniquely specifying and identifying the ports of the storage devices and the allocation destination. Since the logical volume 1 of FIG. 4 is used for the pool, the logical volume 1 is not allocated to the host 0107.

The target ID 0407 is information indicating information (Target ID) for uniquely specifying and identifying the volumes upon access from the allocation destinations of the volumes. For example, if a port is virtually divided into a plurality of ports to allow access (see access paths from the host of FIG. 15), the path of access to a predetermined volume from a device needs to be identified. The target ID 0407 is information for identifying the access path.

The virtual logical volume expansion logical volume ID 0408 is information for uniquely specifying and identifying the logical volumes 0202 or the logical volumes 0203 used in the virtual logical volume expansion policy designation function. More specifically, from which volumes the pages will be set is designated during the expansion of the virtual logical volumes, and the virtual logical volume expansion logical volume ID 0408 is information for specifying the designated logical volumes. The virtual logical volume expansion policy designation function is a function of allocating the pages 0206 in the storage areas of the logical volumes 0202 designated by the virtual logical volume expansion logical volume ID 0408 to the virtual logical volumes 0205 in the expansion of the virtual logical volumes 0205.

(iii) Storage Pool Configuration Table (FIG. 5)

FIG. 5 is a diagram showing an example of configuration of a storage pool configuration table 0500 storing information of the logical volumes 0202 or 0203 constituting the storage pool 0204. The storage pool configuration table 0500 includes, as configuration items, storage pool ID 0501, logical volume ID 0502, port 0503, and external connection location 0504.

The storage pool ID 0501 is information for uniquely specifying and identifying the storage pool 0204. The logical volume ID 0502 is information for uniquely specifying and identifying the logical volumes 0202 included in the corresponding storage pool or information indicating the Target ID provided when the logical volumes 0203 are allocated from the external storage device 0102.

The storage port 0503 and the external connection location 0504 are information indicating the WWN of the SAN port 0115 allocated with logical volumes and the WWN of the SAN port 0125 of the externally connected storage device when the corresponding logical volume is the logical volume 0203 of the externally connected storage device 0102.

(iv) Page Configuration Table (FIG. 6)

FIG. 6 is a diagram showing an example of configuration of a page configuration table 0600 holding a configuration and an access history of the pages 0206. The page configuration table 0600 includes, as configuration items, page ID 0601, virtual logical volume ID 0602, logical volume ID 0603, and allocation date/time 0604.

The page ID 0601 is information for uniquely specifying and identifying the target pages 0206. The virtual logical volume ID 0602 is information for uniquely specifying and identifying the virtual logical volumes allocated with the corresponding pages cut out from the pool 0204. The logical volume ID 0603 is information for uniquely specifying and identifying the logical volumes 0202 or the logical volumes 0203 that actually store the data stored in the corresponding pages. The allocation date/time 0604 is information indicating the date/time of the allocation of the corresponding pages.

Although the data stored in the page of ID=6 in FIG. 6 is to be actually stored in the logical volume of ID=1, the virtual volume is not allocated yet, and the data is blank.

Figure 7:
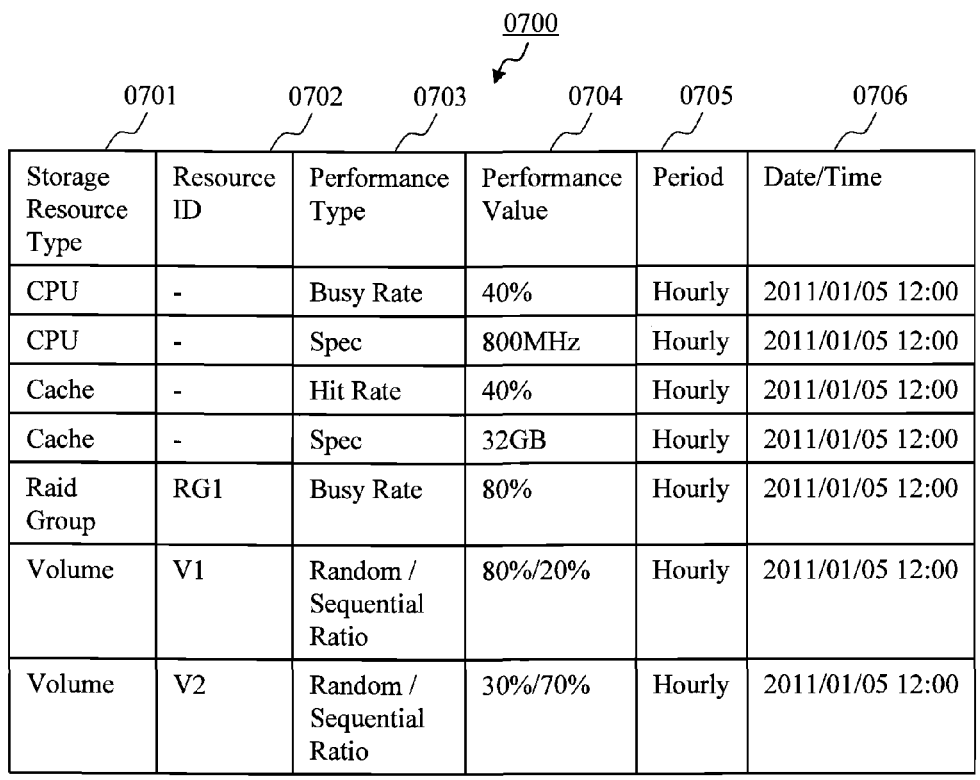
FIG. 7 is a diagram showing an example of configuration of a performance information table.

(v) Performance Information Table (FIG. 7)

FIG. 7 is a diagram showing an example of configuration of a performance information table 0700 holding performance values of resources in the storage device. The performance information table 0700 includes, as configuration items, storage resource type 0701, resource ID 0702, performance type 0703, performance value 0704, period 0705, and date/time 0706.

The storage resource type 0701 is information for uniquely specifying and identifying the types of the storage resources for which the performance is to be managed. The resource ID 0702 is information for uniquely specifying and identifying the managed resources.

The performance type 0703 is information for uniquely specifying and identifying the types of the performance of the resources to be managed. Hit Rate is information indicating the proportion of data that can be returned from the cache when the I/O request is received. Busy Rate in the RAID group is information indicating the period of data reading after the reception of a data read command, in other words, the extent of the operation of the head in the data reading (operation time) while the disk device constituting the storage device is rotating. A Random/Sequential ratio is information indicating the proportion of random access and sequential access (also called I/O characteristics or access pattern) in the I/O request. Another example of the information indicating the I/O characteristics includes a Read/Write ratio indicating the proportion of the read request and the write request in the I/O request.

The performance value 0704 is information indicating the performance of the corresponding resources. In the Random/Sequential ratio, 80%/20% indicates that the proportion of the random access is 80% and the proportion of the sequential access is 20%. The spec of the CPU is a fixed value unless the CPU is changed.

The period 0705 is information indicating the unit of period of the measurement of the performance of the corresponding resources. The unit of period denotes, for example, every hour, every day, and every week. The unit of period may be a compilation period or a measurement cycle. In FIG. 7, "hourly" denotes, for example, that an average of a plurality of measurement values in the period of one hour is taken (in the case of the compilation period).

The date/time 0706 is information indicating the completion date/time of the unit of the measurement period.

<Logical Configuration of Management Server>

Figure 8:
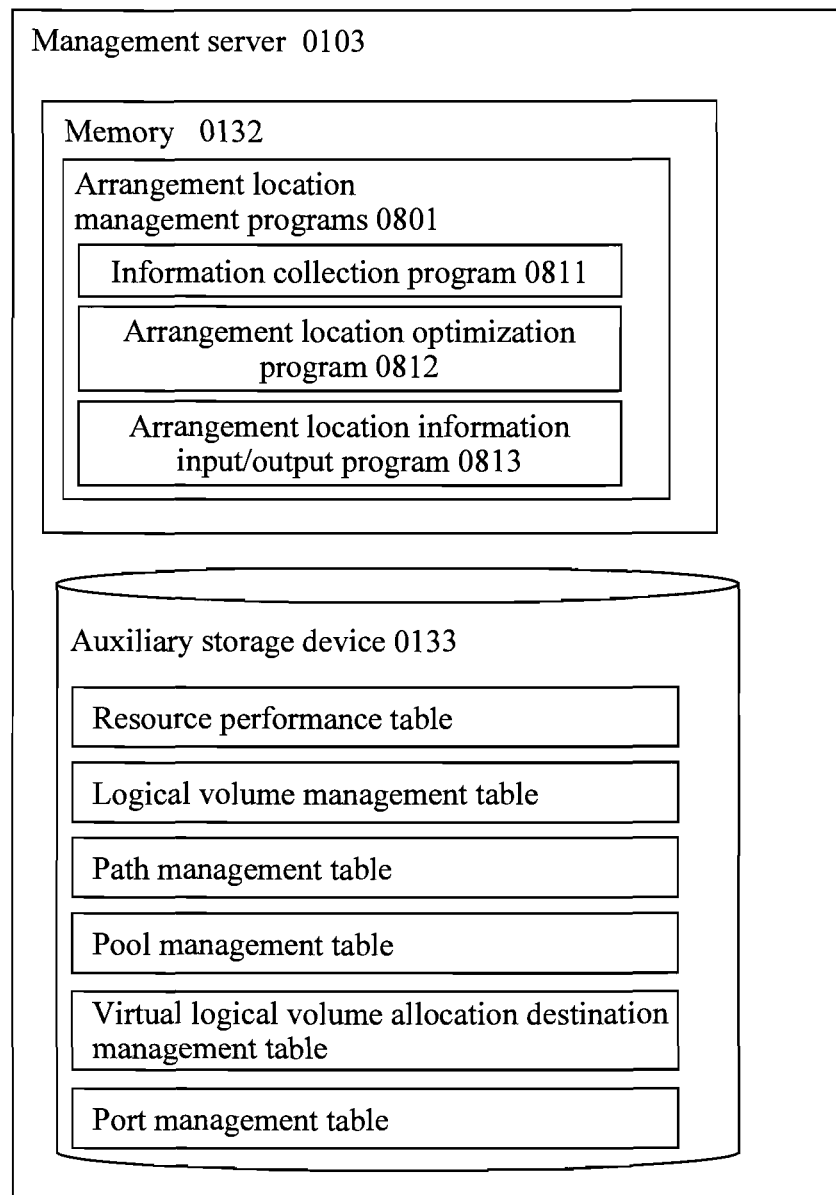
FIG. 8 is a diagram showing an example of logical configuration of a management server.

FIG. 8 is a diagram showing an example of logical configuration on the memory 0132 and the auxiliary storage device 0133 of the management server 0103.

Arrangement location management programs 0801 stored in the memory 0132 include an information collection program 0811, an arrangement location optimization program 0812, and an arrangement location information input/output program 0813.

The auxiliary storage device 0133 stores a resource performance table, a logical volume management table, a path management table, a pool management table, a virtual logical volume management table, and a port management table managed by the arrangement location management programs 0801.

(i) Resource Performance Table (FIG. 9)

FIG. 9 is a diagram showing an example of configuration of a resource performance table 0900 for managing performance information of the resources of the devices collected by the information collection program 0811. The resource performance table 0900 includes, as configuration items, device ID 0901, resource type 0902, resource ID 0903, performance type 0904, and performance value 0905.

The device ID 0901 is information for uniquely specifying and identifying the devices for which the information collection program 0811 has collected the performance information. The resource type 0902 is information for identifying the resource types in the devices. The resource ID 0903 is information for identifying the resources in the resource types of the devices. The performance type column 0904 is information indicating the types of the acquired performance information. The performance value 0905 is information indicating the performance values of the corresponding resources.

Examples of the values stored in the resource performance table 0900 include Busy Rate and Spec of the CPU, Hit Rate and Spec of Cache, Busy Rate of Disk constituting the RAID group, and the proportion of the random access and the sequential access relative to the volume. If the proportion of the random access is high, the remaining capacity of the cache is not so important in improving the use efficiency or increasing the access speed. Meanwhile, if the proportion of the sequential access is high, the use efficiency can be improved, and the access speed can be increased if the remaining capacity of the cache is higher. The information stored in the resource performance table 0900 is not limited to the example shown in FIG. 9, but may be information of the ports in the storage devices.

(ii) Logical Volume Management Table (FIG. 10)

FIG. 10 is a diagram showing an example of configuration of a logical volume management table 1000 for managing the logical configuration of the logical volumes collected by the information collection program 0811 from the controller storage device 0101 or the externally connected storage device 0102. The logical volume management table 1000 includes, as configuration items, logical volume ID 1001, storage device ID 1002, and RAID group ID 1003.

The logical volume ID 1001 is information for uniquely specifying and identifying the logical volumes to be managed. The storage device ID 1002 is information for uniquely specifying and identifying the storage devices that provide the corresponding logical volumes. The RAID group 1003 is information for uniquely specifying and identifying the RAID groups that provide the corresponding logical volumes.

(iii) Path Management Table (FIG. 11)

FIG. 11 is a diagram showing an example of configuration of a path management table 1100. The path management table 1100 manages information indicating paths of the disclosure of the logical volumes 0202 and 0203 or the virtual logical volumes 0205 (information indicating the paths of the disclosure of the volumes). The information collection program 0811 collects the information of the table from the controller storage device 0101 and the externally connected storage device 0102.

The path management table 1100 includes, as configuration items, storage device ID 1101, volume ID 1102, allocation source 1103, allocation destination 1104, target ID 1105, and pool management table ID (record ID) 1106.

The storage device ID 1101 is information for uniquely specifying and identifying the storage devices that provide the disclosed logical volumes.

The volume ID 1102 is information for uniquely specifying and identifying the disclosed volumes.

The allocation source 1103 is WWN information indicating from which SAN ports of the storage devices the volumes are disclosed. The allocation destination 1104 is WWN information indicating the locations of the disclosure of the corresponding logical volumes.

The target ID 1105 stores information commonly used by the devices of the allocation sources and the allocation destinations to identify the volumes disclosed through the same path. As described, there are, for example, two paths from the port of a host A to the port of a storage device A in FIG. 15 described later. The target ID identifies the paths.

The pool management table ID (record ID) 1106 is information corresponding to values of record ID 1206 of a pool management table 1200 described later. The information is inputted when the logical volumes allocated from the externally connected storage device 0102 constitute the storage pool.

For example, a third entry in FIG. 11 will be described. A logical volume 2 of a storage device B is disclosed from the port of the allocation source 1103 to the port of the allocation destination 1104 through the path indicated by target ID=2.

Figure 12:
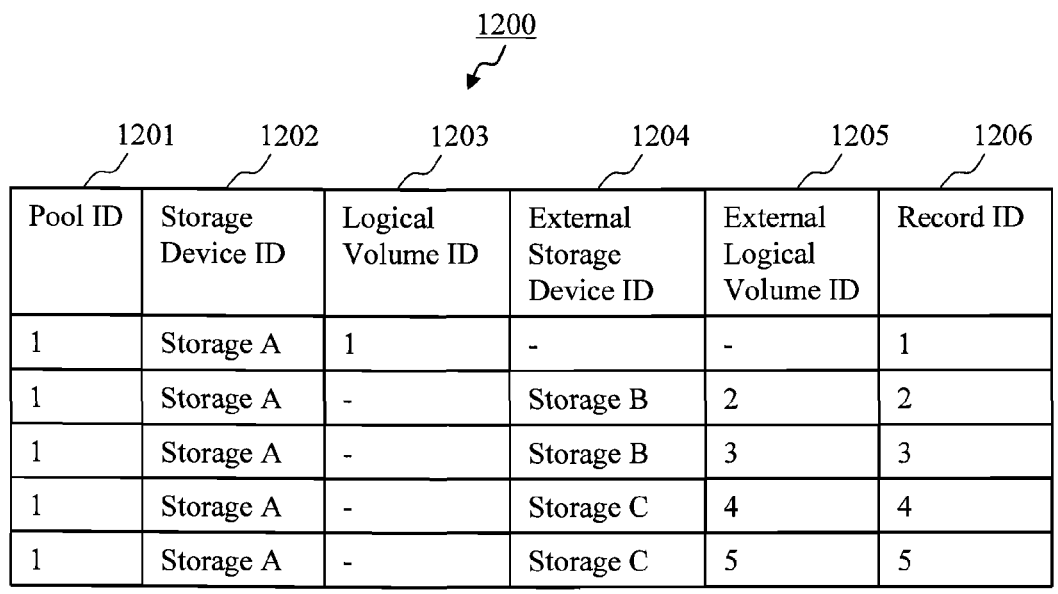
FIG. 12 is a diagram showing an example of configuration of a pool management table on the management server.

(iv) Pool Management Table (FIG. 12)

FIG. 12 is a diagram showing an example of configuration of the pool management table 1200. In the pool management table 1200, the information collection program 0811 manages the configuration information of the storage pool 0204 collected from the controller storage device 0101 and the externally connected storage device 0102. The pool management table 1200 includes, as configuration items, pool ID 1201, storage device ID 1202, logical volume ID 1203, externally connected storage device ID 1204, external logical volume ID 1205, and the record ID 1206.

The pool ID 1201 is information for uniquely specifying and identifying the storage pool 0204 in the storage devices that hold the storage pool 0204.

The storage device ID 1202 is information for uniquely specifying and identifying the storage devices including the storage pool 0204.

The logical volume ID 1203 is information for uniquely specifying and identifying the logical volumes of the controller storage device 0101 constituting the corresponding storage pool 0204. More specifically, the field of the logical volume ID 1203 stores information for uniquely identifying the logical volume in the storage device when the logical volume is the same storage device (controller storage device 0101) as the storage pool.

The external storage device ID 1204 is information for specifying the externally connected storage devices 0102 that provide the logical volumes to the corresponding storage pool 0204. The external logical volume ID 1205 is information for uniquely specifying and identifying the logical volumes of the externally connected storage devices 0102 constituting the corresponding storage pool 0204. More specifically, the fields of the external storage device ID 1204 and the external logical volume ID 1205 store information for uniquely identifying the externally connected storage devices 0102 and the logical volumes when the storage pool is constituted by logical volumes allocated from storage devices (externally connected storage devices 0102) different from the storage device (controller storage device 0101) constituting the corresponding storage pool.

The record ID 1206 is information for uniquely specifying and identifying the entries of the pool management table 1200.

It can be recognized from the table that the pool identified by ID=1 is constituted by the logical volumes identified by ID=1 to 5.

(v) Relationship between Path Management Table 1100 and Pool Management Table 1200

As described, the information collection program 0811 collects the information of the pool management table 1200 and the path management table 1100 from the controller storage device 0101 and the externally connected storage device 0102.

However, the information of the tables is not collected at once.

In the path management table 1100, only the storage device ID 1101, the allocation source 1103, the allocation destination 1104, and the target ID 1105 are first acquired.

Meanwhile, in the pool management table 1200, only the record ID 1206 for identifying the entry is first provided.

Therefore, the field of the external logical volume ID 1205 is blank. Thus, at the initial stage, the storage device (storage A) specified by the storage device ID 1202 does not recognize the external logical volumes constituting the pool.

Subsequently, the path management table 1100 is referenced to associate (map) the external logical volumes and the pools. In the path management table 1100, the volumes of the externally connected storage devices are recognized by the allocation source and allocation destination ID (port ID) 1103 and 1104 and the target ID 1105. Therefore, the external logical volumes are identified from the information recognized by the externally connected storage devices (information recognized by the same port ID and target ID). More specifically, the external logical volume ID 1102 is specified by the storage device ID 1101, the allocation source 1103, the allocation destination 1104, the target ID 1105, and the information from the storage devices. When the volume ID 1102 is specified in the path management table 1100, the external logical volume ID 1205 is written in the pool management table 1200 in association with the record ID.

In this way, with which logical volume of which storage device the pool is associated can be recognized from the pool management table 1200. Therefore, the record ID 1206 of the pool management table 1200 is further inputted to the pool management table ID 1106 of the path management table 1100.

The foregoing procedure specifies which volumes of which storage devices the volumes constituting the pool (pool 1) specified by the pool ID 1201 are.

(vi) Virtual Logical Volume Management Table (FIG. 13)

FIG. 13 is a diagram showing an example of configuration of a virtual logical volume management table 1300. The virtual logical volume management table 1300 stores information of the virtual logical volumes 0205 collected by the information collection program 0811 from the controller storage device 0101 and evaluation values obtained by the arrangement location optimization program 0812 evaluating the logical volumes as storage locations of the data of the virtual logical volumes 0205.

The virtual logical volume management table 1300 includes, as configuration items, virtual logical volume ID 1301, pool ID 1302, storage device ID 1303, storage location storage device ID 1304, evaluation value 1305, logical volume ID 1306, and volume evaluation value 1307.

The virtual logical volume ID 1301 is information for uniquely specifying and identifying the virtual logical volumes created in the computer system 0100. The pool ID 1302 is information for uniquely specifying and identifying the storage pool 0204 that holds the corresponding virtual logical volumes. The storage device ID 1303 is information for uniquely specifying and identifying the storage device (controller storage device 0101) that stores the corresponding virtual logical volumes. The storage location storage device ID 1304 is information for uniquely specifying and identifying the storage devices that hold the storage areas storing the actual data provided to the corresponding virtual logical volumes. The logical volume ID 1306 is information for uniquely specifying and identifying the logical volumes constituting the virtual logical volumes. The virtual logical volume ID 1301, the pool ID 1302, the storage device ID 1303, the storage location storage device ID 1304, and the logical volume ID 1306 are acquired by the information collection program 0811 and stored in the virtual logical volume management table 1300.

The evaluation value 1305 is information indicating the appropriateness of the storage devices of the logical volumes that provide the storage areas storing the data of the virtual logical volumes. For example, values determined by the I/O characteristics are inputted to the evaluation value 1305. The volume evaluation value 1307 is information indicating the evaluation of the logical volumes. For example, according to FIG. 9, the I/O characteristics (access pattern) of the virtual logical volume V1 of the storage device A indicate that the random access is 80%, and the access pattern imposes a load on the disk device. At this point, Busy Rate of the RAID group created from RG 1 of the storage device A is 80%. Therefore, the load cannot be imposed on the disk device any more, and the volume evaluation value 1307 is low. According to FIG. 10, RG 3 constitutes logical volumes 4 and 5. According to FIG. 9, Busy Rate of RG is 20%, and there is room in the operation state of the disk device. Therefore, the value of the volume evaluation value 1307 is relatively high. The arrangement location optimization program 0812 can execute a calculation process described later to obtain the information of the evaluation value 1305 and the volume evaluation value 1307.

Figure 14:
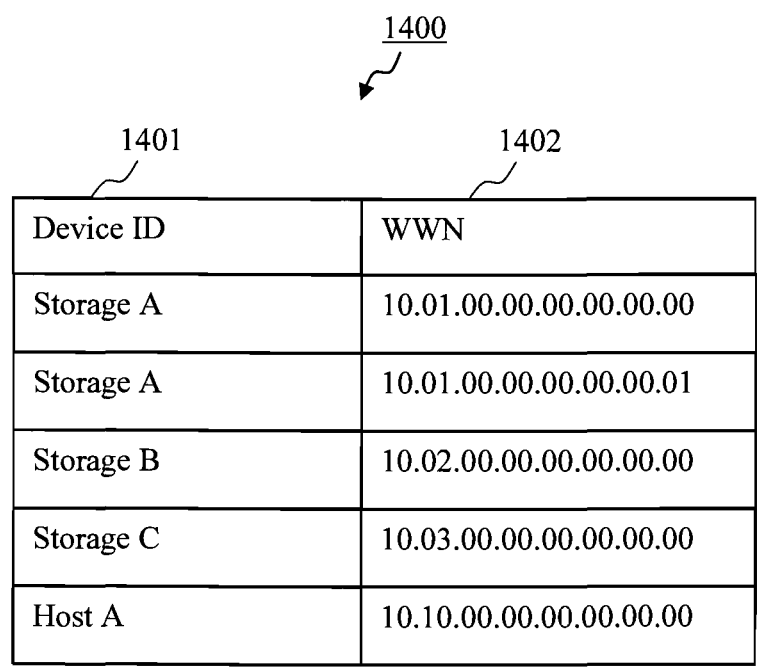
FIG. 14 is a diagram showing an example of configuration of a port management table on the management server.

(vii) Port Management Table (FIG. 14)

FIG. 14 is a diagram showing an example of configuration of a port management table 1400 for managing the WWN of the SAN port of the devices connected to the SAN 0145. The information collection program 0811 collects the configuration information of the port management table 1400 from the host 0107 through the LAN 0106. The port management table 1400 includes, as configuration items, device ID 01401 and WWN 1402.

The device ID 1401 is information for uniquely specifying and identifying the target devices of the information collection. The WWN 1402 is information of the WWN collected from the corresponding devices.

(viii) Example of Configuration of Data Obtained from Tables

Figure 15:
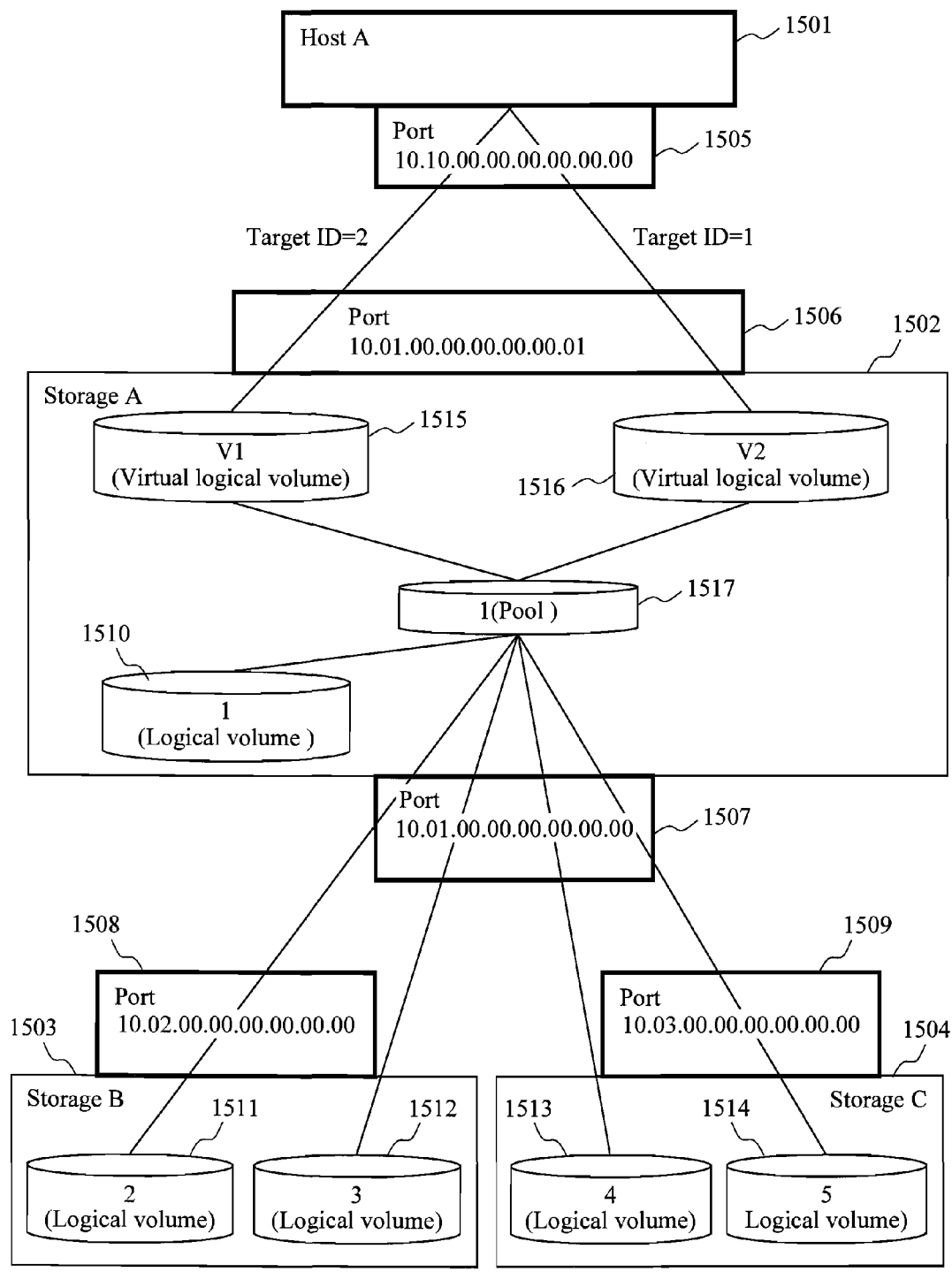
FIG. 15 is a diagram showing a logical relationship between devices and volumes.

FIG. 15 is a diagram showing a logical configuration relationship between devices, logical volumes, and ports reproduced from the tables 1000 to 1200 and 1400 (FIGS. 10 to 12 and 14). The management server 0103 can, for example, recognize the logical configuration in the computer system 0100 as follows.

The positional relationship between devices 1501 to 1504 and ports 1505 to 1509 included in the devices 1501 to 1504 becomes apparent with reference to the port management table 1400.

Logical volumes 1510 to 1514 and virtual logical volumes 1515 and 1516 included in the storage devices 1502 to 1504 are arranged based on the information of the volume ID 1102 of the path management table 1100. The relationship of connection between the logical volumes 1510 to 1516 and the ports 1505 to 1509 becomes apparent based on the information of the allocation source 1103, the allocation destination 1104, and the target ID 115 of the path management table 1100.

It can be recognized that a pool is set to the storage device A 1502 with reference to the pool management table 1200. Therefore, a logical volume 1_1510 and external logical volumes 2_1511 to 5_1514 that constitute the pool are associated with a pool 1_1517.

In this way, the management server 0103 can recognize the logical configuration in the computer system 0100 based on the collected information.

<Summary of Processes by Management Server>

Figure 16:
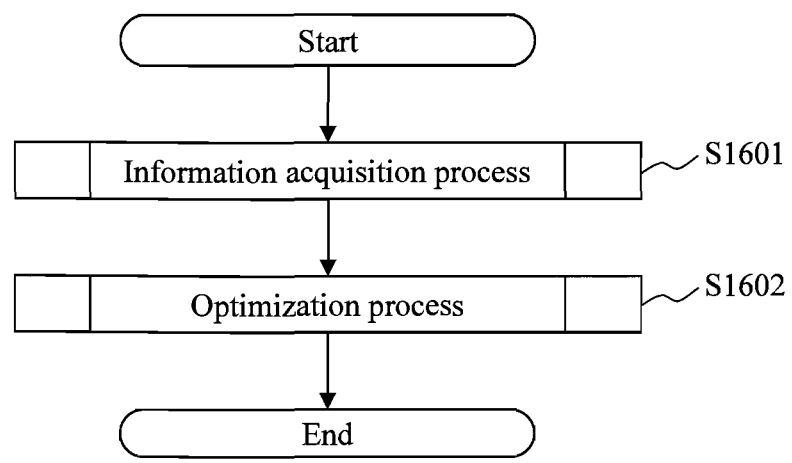
FIG. 16 is a flow chart for describing a summary of overall processing of the present invention.

FIG. 16 is a flow chart for explaining a summary of processes executed by the management server 0103. The processes executed by the management server 0103 include an information acquisition process and an optimization process.

The former is executed by the information collection program 0811, and the latter is executed by the arrangement location optimization program 0812.

In step S1601, the information collection program 0811 collects predetermined information (information to be stored in the tables of FIGS. 9 to 14) from the controller storage device 0101, the externally connected storage device 0102, and the host 0107 and stores the information in the fields of the tables. Details of the process of the step will be described with reference to FIG. 17.

In step S1602, based on the information collected in step S1001, the arrangement location optimization program 0812 evaluates which logical volume among the logical volumes constituting the storage pool 0204 is desirable in storing the page data of the virtual logical volume 0205 and sets the evaluation to the controller storage device 0101. Details of the process of the step will be described with reference to FIG. 18.

As described, the main process of the present embodiment is to collect predetermined necessary information from the devices and determine the optimal storage locations of the data to be stored in the virtual logical volumes.

<Details of Information Acquisition Process>

Figure 17:
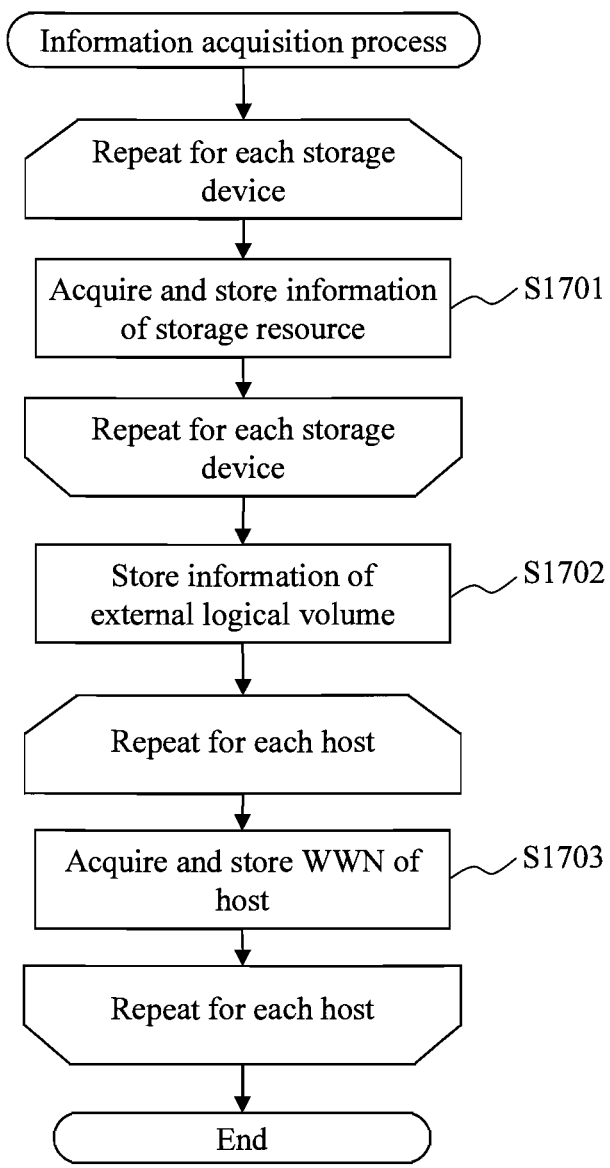
FIG. 17 is a flow chart for describing details of an information acquisition process.

FIG. 17 is a flow chart for explaining details of the information acquisition process (S1601). In the process, the information collection program 0811 collects information from the devices and stores the data in the tables.

(i) Step S1701

The information collection program 0811 acquires information of the resources from the storage devices and stores the information in the resource performance table 0900. More specifically, the information collection program 0811 acquires configuration information of the resources, information of the types of the resources, and information of the performance values of the resources from the devices and stores the information in the resource performance table 0900. Hereinafter, the types of the resources to be acquired and a method of the storage will be described.

(Logical Volume)

The information collection program 0811 stores the identification information of the storage devices of the information acquisition target in the storage device ID 1002 of the logical volume management table 1000. The information collection program 0811 stores the identification information of the RAID group that provides the logical volumes in the RAID group ID 1003. The information collection program 0811 further stores the identification information of the logical volumes in the storage devices of the information acquisition target in the logical volume ID 1001.

(Disclosed Information of Volume)

The information collection program 0811 collects path information of the logical volumes or the virtual logical volumes disclosed from the storage devices of the information acquisition target to the host or other storage devices and stores the path information in the path management table 1100.

The information collection program 0811 checks whether the acquired path information is already stored in the allocation source 1103, the allocation destination 1104, and the target ID 1105.

If the path information is stored as a result of the check, the information collection program 0811 stores the acquired identification information of the storage devices and identification information of the volumes in the storage device ID 1101 and the volume ID 1102. If the path is not stored as a result of the check, the information collection program 0811 stores the path information as a new record in the allocation source 1103, the allocation destination 1104, and the target ID 1105.

The information collection program 0811 stores the information of the storage device ID and the volume ID in the added record.

(Storage Pool)

The information collection program 0811 stores information in the pool management table 1200 for each logical volume constituting the storage pool 0204. More specifically, the identification information of the storage pool and the identification information of the storage device are stored in the pool ID 1201 and the storage device ID 1202. Information for uniquely identifying the entries of the pool management table 1200 is stored in the record ID 1206.

More specifically, if the logical volumes constituting the storage pool 0204 exist in the same storage device (controller storage device) as the storage pool 0204, the information collection program 0811 stores the identification information of the logical volumes in the logical volume ID 1203. On the other hand, if the logical volumes constituting the storage pool 0204 are logical volumes disclosed (attached) from a storage device (externally connected storage device) other than the storage device in the storage pool 0204, the information collection program 0811 searches the disclosed paths of the logical volumes from the path management table 1100.

If the records (disclosed paths) are detected by the search, the information collection program 0811 stores the information stored in the record ID 1206 of the pool management table in the pool management table ID 1106. The order of storage varies depending on the order of acquisition, and the information is stored in the fields in order of the identification of the information.

If the records (disclosed paths) are not detected by the search, the information collection program 0811 adds the paths of the disclosed logical volumes to the path management table 1100 as new records. More specifically, the information collection program 0811 stores the allocation source 1103, the allocation destination 1104, and the target ID 1105 of the disclosed logical volumes as path information. The information collection program 0811 stores the information stored in the field of the record ID 1206 of the pool management table 1200 in the pool management table ID 1106.

(Virtual Logical Volumes)

The information collection program 0811 stores the identification information of the storage pool 0204 including the virtual logical volume 0205 and the identification information of the storage device in the virtual logical volume management table 1300 for each virtual logical volume 0205.

(ii) Repetition Process

The information collection program 0811 repeats the process of step S1701 to all storage devices in the computer system 0100.

(iii) Step S1702

Step S1702 is a process of storing the identification information of the externally connected storage device and the identification information of the external logical volume in the pool management table 1200 if there is a logical volume associated with the storage pool 0204 in the externally connected storage device 0102.

The information collection program 0811 checks the entries (records) of the pool management table 1200 from the top. If there is a record without a value in the logical volume ID 1203, the information collection program 0811 searches, from the pool management table 1200, the record including the same value as the record ID 1206 of the record stored in the pool management table ID 1106 of the path management table 1100. The information collection program 0811 stores the values of the storage device ID 1101 and the volume ID 1102 of the record found by the search in the external storage device ID 1204 and the external logical volume ID 1205 of the pool management table 1200.

(iv) Step S1703

The information collection program 0811 acquires the WWN of the SAN port 0173 of the host 0107 and stores the WWN in the port management table 1400.

(v) Repetition Process

The information collection program 0811 repeats the process of step S1103 for all hosts 0107 in the computer system 0100.

<Details of Optimization Process>

Figure 18:
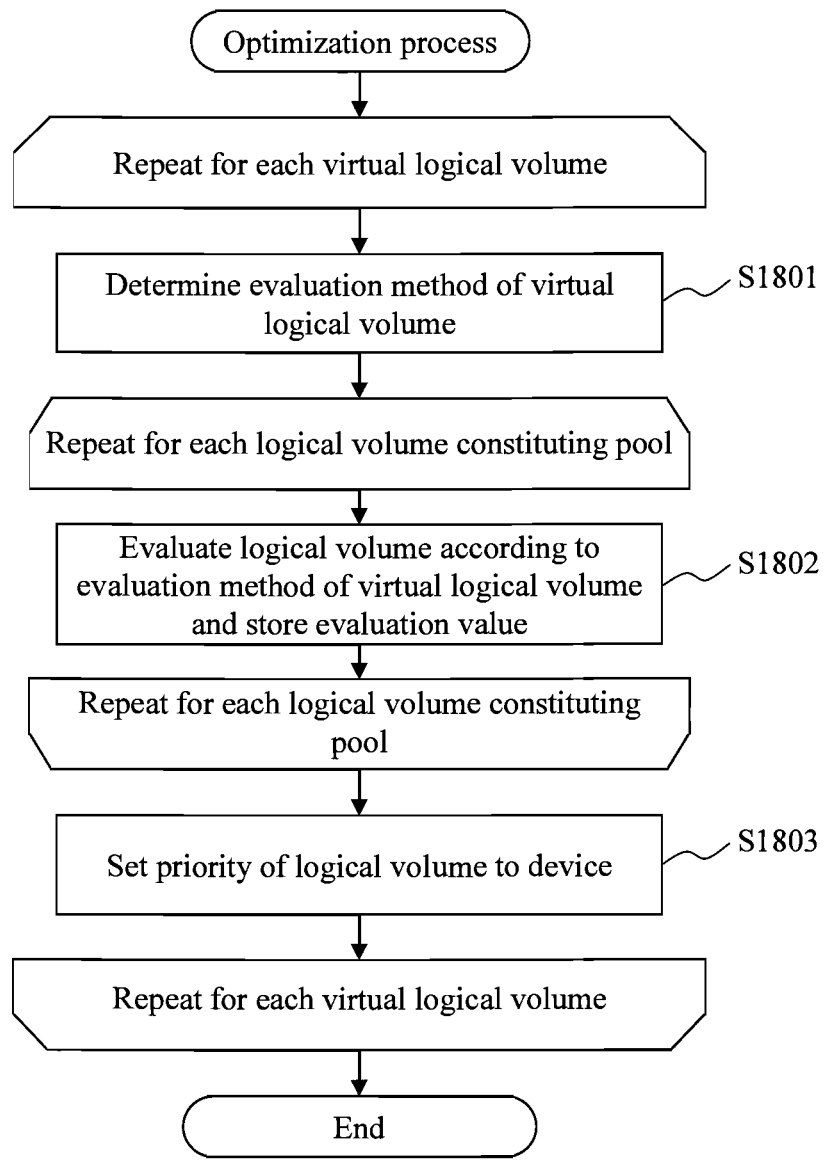
FIG. 18 is a flow chart for describing details of an optimization process.

FIG. 18 is a flow chart for explaining details of the optimization process (S1602). The arrangement location optimization program 0812 evaluates to which logical volumes the data of the virtual logical volumes 0205 can be arranged to improve the use efficiency of the resources and sets the storage locations in the storage devices. Hereinafter, the evaluation summary and the principle will be described first, and then steps indicating a specific evaluation process will be described.

(i) Evaluation Summary and Principle

In step S1601, the arrangement location optimization program 0812 determines which type of hardware can be used to improve the response, from the I/O characteristics to the virtual logical volumes 0205 (proportion of the random access and the sequential access and/or proportion of the read request and the write request) based on the information acquired from the devices in the computer system 0100.

The arrangement location optimization program 0812 specifies storage devices that can be used by the hardware recognized by the determination in the computer system environment or that can be used more by the hardware. Lastly, the arrangement location optimization program 0812 controls the controller storage device 0101 to store the data in the storage devices.

More specifically, in the evaluation of the use efficiency, the proportion of the random access and the sequential access is used as the I/O characteristics of volume for the virtual logical volumes 0205, for example. The evaluation method of the hardware by the I/O characteristics is based on the recognition that the response tends to be good if the type of the drive is good in the case of the random access, and the response tends to be good if there is a large cache capacity to be used (remaining capacity) in the case of the sequential access. If the proportion of the random access to the virtual logical volume 0205 is high, the evaluation of the logical volume with a good drive type (and low Busy Rate of drive) is designed to be high. On the other hand, if the proportion of the sequential access is high, the evaluation of the logical volume with a large unused cache capacity is designed to be high.

In this way, the information of the storage device to be emphasized in the selection of the externally connected storage device varies depending on the I/O characteristics relative to the logical volume. Therefore, the evaluation value of the storage device and the I/O characteristics (i.e. evaluation value) of the logical volume are combined in the evaluation. In another specific combination method of evaluation, information of hardware (CPU, cache) affecting the entire storage device and information of hardware (RAID group, Drive) only affecting the logical volume are separately evaluated, and the information is set as an evaluation value of the storage and an evaluation value of the logical volume.

In the present embodiment, a logical volume with a high evaluation value is selected from the logical volumes with high evaluation value of storage device to determine the logical volume as the optimal arrangement location. Examples of other methods of combining two evaluation values include a method of weighting the sum of the evaluation value of the storage device and the evaluation value of the logical volume and a method of calculating a product of the evaluation values. More specifically, for example, when data is dispersed to a plurality of storage devices, it is more likely to be affected by failures of the storage devices. Therefore, the data of the same host is stored in a single storage device as much as possible in some cases. In that case, an evaluation method of selecting storage devices with high evaluation values to select a logical volume from the storage devices is adopted. A method of calculating the sum while weighting the evaluation value of the storage device and the evaluation value of the logical volume or a method of calculating the product of the evaluation values is selected when the dispersion of the data of the host in the computer system can be accepted as a result of putting an emphasis on the most efficient use of the computer system. In that case, the weight of the evaluation values of the storage device and the logical volume are changed in the operation based on the information indicating the acceptable extent of the dispersion of the data of the same host to the storage device.

Hereinafter, steps of the flow chart will be used to explain a specific evaluation process.

(ii) Step S1801

In step S1801, the arrangement location optimization program 0812 determines parameters a and b in the following (Expression 1) and (Expression 2) to determine how to evaluate the logical volumes as the data storage locations of the virtual logical volumes 0205. More specifically, the virtual logical volumes to be evaluated are specified, and information indicating the access pattern of the access to the virtual logical volumes and information of the spec of the CPU and the like are acquired to determine the parameters.

For example, the evaluation values of the storage devices and the volumes are determined as follows.

$$\text{Evaluation value of storage} = a*(\text{CPU spec})*(100-(\text{CPU Busy Rate})) + b*(\text{Cache Size})*(100-(\text{Cache Hit Rate})) \quad \text{(Expression 1)}$$

$$\text{Evaluation value of logical volume} = (\text{drive type of RAID group})*(100-(\text{Drive Busy Rate})) \quad \text{(Expression 2)}$$

Here, a and b denote emphasis proportions of the CPU and the cache, respectively, which are the same proportions as the random access and the sequential access of the I/O to the virtual volume. The CPU spec is a value scaling the highest CPU spec in the computer system 0100 as 1 and the lowest CPU spec as 0. The cache size is a value scaling the largest Cache size in the computer system 0100 as 1 and the smallest Cache size as 0. The drive type of RAID group is a value calculated by setting a drive type with a high spec to 1 and subtracting a value obtained by dividing 1 by the number of drive types in the computer system every time the spec of the drive type drops one level.

As for the I/O characteristics, the evaluation value may be calculated based on the proportion of read and write (Read/write characteristics), or the evaluation value may be calculated in consideration of the ratio of read and write in addition to the proportion of the random access and the sequential access. For example, the remaining capacity of cache is scarcely emphasized during reading in the random access (case 1). The remaining capacity of cache tends to be emphasized during reading in the sequential access (case 2). If there are a large number of write requests, the response is not generally affected even if the cache remaining capacity is large. However, for example, writing to the disk device may be ultimately performed after writing to the cache first, and the remaining capacity of cache may affect the response to the I/O request (case 3). The remaining capacity of cache may have an effect in the cases 2 and 3. However, in general, it is difficult to set the rule for determining the parameters a and b, and whether to put an emphasis varies in each event. In the case 1, the parameter a is more emphasized by lowering the value of the parameter b, compared to when the parameter is determined only by the proportion of the random access and the sequential access. For example, when random access/ sequential access=40%/60%, a=40(%) and b=0(%) if read/ write=100%/0%. In the same case, a=20(%) and b=30(%) if read/write=50%/50%.

Other than simple linear functions as in (Expression 1) and (Expression 2), a method of setting the evaluation value of the storage device to 0 when Busy Rate of the CPU is greater than a threshold may be used, or an evaluation function defined by the user may be used. The load state of the port that discloses the volume may be used for the performance value used in the evaluation function.

In an overall evaluation method of the logical volume as the destination of the storage of the data of the virtual logical volume, a logical volume with high evaluation of logical volume among the devices with high evaluation values of storage device is set.

Another example of the overall evaluation method of logical volume includes a method of calculating the sum or the product of the evaluation of the storage device and the evaluation of the logical volume and selecting the logical volume from the computer system regardless of the storage device. If the resource performance table 0900 is formed to include information related to past performance values, there is a method of weighting the information of the past performance values to evaluate the storage device and reflecting the evaluation on the calculation of the evaluation of the logical volume.

(iii) Step S1802

In step S1802, the arrangement location optimization program 0812 evaluates the logical volumes according to the evaluation method determined in step S1801 (using determined parameters) and stores the evaluation values in the virtual logical volume management table 1300. The arrangement location optimization program 0812 stores the evaluated logical volumes and the information identifying the storage devices (storage location storage devices) storing the logical volumes in the logical volume ID 1306 and the storage location storage device ID 1304. The arrangement location optimization program 0812 stores the evaluation values of the storage devices and the evaluation values of the logical volumes in the evaluation value 1305 and the volume evaluation value 1307, respectively.

The process of step S1802 is repeatedly executed for each logical volume constituting the storage pool 0204 that provides the virtual logical volumes. The logical volumes constituting the storage pool 0204 to be processed can be specified from the storage device ID 1202 and the logical volume ID 1403 or from the external storage device ID 1204 and the external logical volume ID 1205 that store the identification information of the storage pool 0204 in the pool ID 1201 of the pool management table 1200.

(iv) Step 1803

In step S1803, the arrangement location optimization program 0812 determines the priority of the logical group used as the allocation destination of the pages of the virtual logical volumes 0205 and sets the priority in the controller storage device 0101. In the setting of the present embodiment, logical volumes are used in descending order of the evaluation values among the logical volumes included in the storage devices with high evaluation values.

The arrangement location optimization program 0812 repeatedly executes the process of steps S1801 to S1803 for the virtual logical volumes managed by the virtual logical volume management table 1300.

(v) After Optimization Process

The controller storage device 0101 uses the virtual logical volume expansion policy designation function to allocate the pages of the virtual logical volumes 0205 to the logical volumes with high evaluation values determined according to step S1803.

If a function of moving the data stored in logical storage areas to other logical storage areas (migration function) is included, the storage control program 0114 of the controller storage device 0101 can use the migration function to move the data from the logical volumes storing the pages 0206 of the virtual logical volumes 0205 to the storage areas of the logical volumes designated in step S1203. The migration function can be used to move the data of the virtual logical volumes 0205 to the logical volumes of the controller storage device 0101 or to the logical volumes allocated to the controller storage device 0101 by the externally connected storage device 0102.

<Arrangement Location Display GUI>

FIG. 19 is a diagram showing an example of configuration of an arrangement location display GUI screen after the optimization process generated by the arrangement location information input/output program 0813. The GUI screen 1900 displays the states of the virtual logical volumes, and the manager (user) can instruct a setting change based on the screen.

Specifically, the arrangement location information input/ output program 0813 first displays, on the screen, the information of the host 0107 using the virtual logical volumes and the information of the I/O characteristics (also called "access characteristics": proportion of the random access and the sequential access and Read/Write proportion). At this point, the manager can press an Edit button to change the access characteristics held by the arrangement location information input/output program 0813.

Storage location definitions (storage devices and volumes) of the data of the virtual logical volumes set in step S1803 are displayed on the GUI screen 1900. The information of the storage location definitions can be edited when the manager presses the Edit button, and the setting can be appropriately changed. Current storage location volume denotes volumes currently storing the virtual logical volumes. Priority allocation destination volume denotes volumes to which the corresponding virtual logical volumes should be preferentially allocated as a result of the evaluation. Here, the volume that should be stored and the currently stored volume match in the virtual logical volume V1. Meanwhile, although all data should be stored in the priority allocation destination volume in the virtual logical volume V2, the data is also currently stored in another volume. If the current volume and the result of evaluation (priority allocation destination volume) are different, the data may be automatically migrated, or the manager (user) may be able to instruct the migration. Since there is a load in the execution of the migration process, frequent execution is not preferable. It may be more efficient to execute the migration process only when there is an instruction by the manager.

The GUI screen 1900 also displays the logical volumes constituting the pool and the performance information of the storage devices to which the logical volumes belong as detailed information of the pool selected in a drop-down menu.

The manager can use the GUI screen 1900 to perform at least the following three things.

(i) Check Information

The manager can check the performance information and the configuration information of the virtual logical volumes. As a result, the manager (user) can recognize at once the information of the access characteristics of the virtual logical volumes, storage location definitions of the data of the virtual logical volumes, and the performance information of the pool to which the virtual logical volumes belong.

(ii) Set Access Characteristics

The manager can use the GUI screen 1900 to set and change the access characteristics held by the arrangement location information input/output program 0813. As a result, just after the allocation of the volumes to the host 0107 or when the access characteristics are changed to operate a new application on the host 0107, the manager (user) can input in advance the access characteristics that the manager knows to use step S1602 before the start of the operation to designate to allocate pages suitable for the access characteristics of the virtual logical volumes to the volumes.

(iii) Set Storage Location

The manager can use the GUI screen 1900 to set the storage location definition information. As a result, the manager can designate the storage locations of the data of the virtual logical volumes to specific storages or can change part of the result of step S1602.

(2) Second Embodiment

Instead of the controller storage device 0101 in the first embodiment, a switch or an application server that provides a virtual technique for managing storage areas across a plurality of externally connected storage devices can be used.

In that case, the switch or the application server that provides the virtualization technique is connected to the SAN 0145 and the LAN 0106 as in the controller storage device 0101.

The switch or the application server that provides the virtualization technique needs to have similar functions as the storage control program 0114. However, the logical storage area configuration function included in the storage control program 0114 does not have a function of establishing the RAID group 0201 and the logical volume 0202. In this regard, the storage control program is a virtual machine control program in a second embodiment.

In the second embodiment, virtual machine software (hypervisor) on the server is used as a virtual technique for intensively managing the storage areas across the plurality of externally connected storage devices 0102. The virtual machine software has a function of establishing virtual machines on the volumes allocated from the plurality of storage devices. The second embodiment is a modified example of the first embodiment. Therefore, instead of the description of all configurations and operations, parts to be reread based on the first embodiment will be illustrated.

<Configuration of Computer System>

Figure 20:
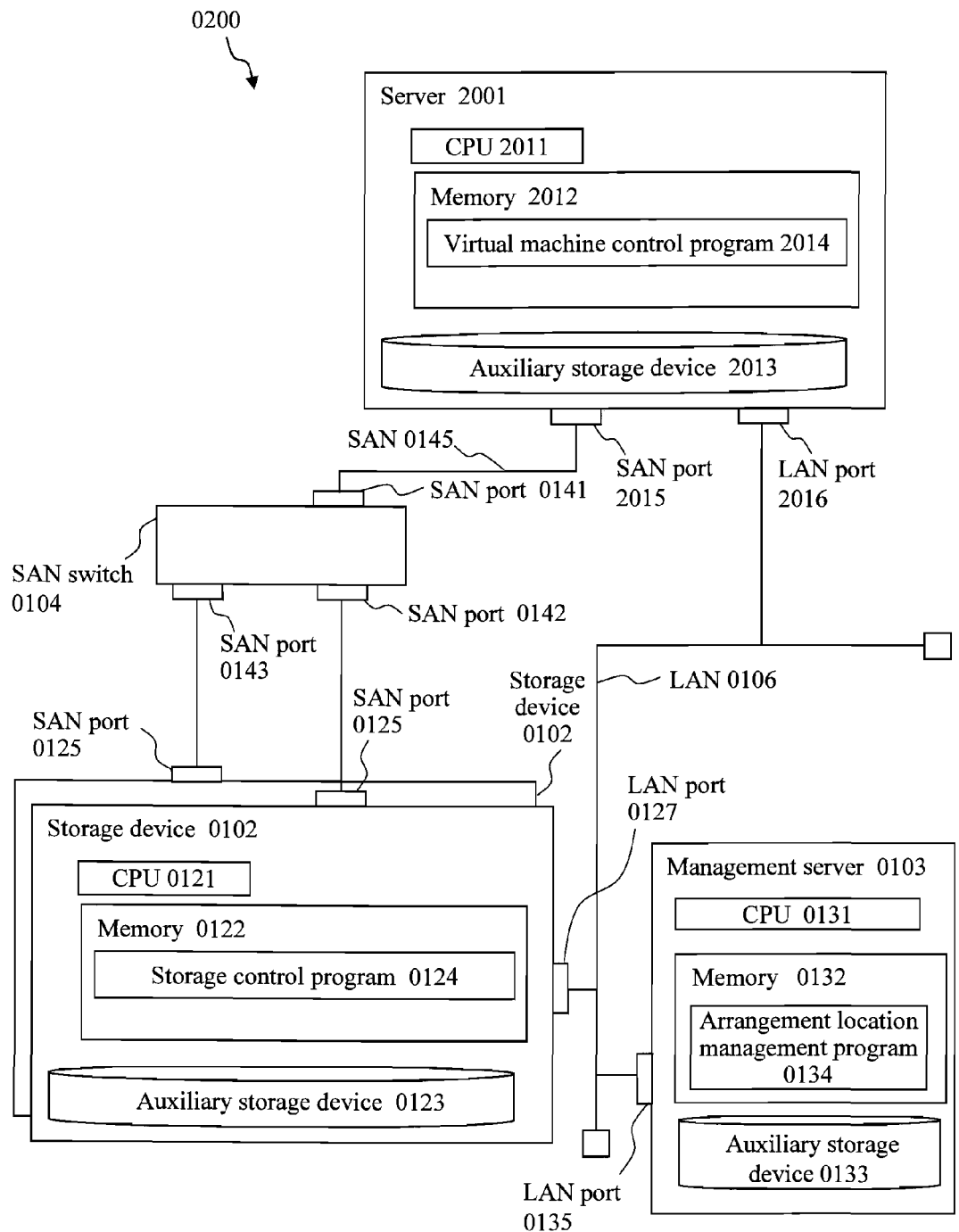
FIG. 20 is a diagram showing a schematic configuration of a computer system according to a second embodiment of the present invention.

FIG. 20 is a diagram showing a schematic configuration of a computer system 0200 according to the second embodiment. The computer system 0200 includes a server 2001, at least one externally connected storage device 0102, the management server 0103, and the SAN (Storage Area Network) switch 0104. The server 2001 and the externally connected storage device 0102 are connected by the SAN 0145. The server 2001, the storage device 0102, and the management server are connected by the LAN (Local Area Network) 0106.

The server 2001 includes a SAN port 2015 and is connected to the SAN 0105 by the SAN port 2015. The server 2001 also includes a LAN port 2016 and is connected to the LAN 0106 by the LAN port 2016.

The server 2001 includes a CPU 2011, a memory 2012, and an auxiliary storage device 2013.

The CPU 2011 executes a virtual machine control program 2014 stored in the memory 2012 to execute various processes. The memory 2012 stores information necessary for the CPU 2011 to execute the virtual machine control program 2014.

The virtual machine control program 2014 handles the auxiliary storage device 2013 as a storage area as described below. Although FIG. 20 includes one auxiliary storage device 2013, the number of the auxiliary storage device 2013 is not limited to one. FIG. 20 may include a plurality of auxiliary storage devices. Examples of the auxiliary storage device 2013 include an FC (Fibre Channel) disk and an SSD (Solid State Drive).

Functions of the virtual machine control program 2014 will be described later.

The configurations of the externally connected apparatus 0102, the management server 0103, and the SAN switch 0104 are as described in the first embodiment, and the description will not be repeated.

<Virtual Machine Control Program>

Details of the virtual machine control program 2014 can be illustrated by rereading FIG. 2. Hereinafter, the rereading will be described.

To be adapted to the second embodiment, the controller storage device 0101 is reread as the server 2001 in FIG. 2 and the description of FIG. 2. The memory 0112 is reread as the memory 2012. The auxiliary storage device 0113 is reread as the auxiliary storage device 2013. The storage control program 0114 is reread as the virtual machine control program 2014. The virtual logical volumes 0205 are reread as virtual machine storage areas. The storage pool 0204 is reread as the virtual machine software. The virtual logical volumes 0205 are reread as virtual machines (VM).

The virtual machine control program 2014 has substantially the same functions as the storage control program 0114 in the first embodiment. More specifically, the virtual machine control program 2014 has the logical storage area configuration function, the virtual logical volume expansion function (function of allocating the pages 0206 to the virtual machines according to an I/O command from the devices that have allocated the volumes), the virtual logical volume expansion policy designation function (function of designing in advance the possible pages to be allocated during the expansion of the virtual machine storage areas), and the performance information collection function. However, the virtual machine control program 2014 does not have the logical volume allocation function.

<Logical Configuration of Management Server>

The logical configuration of the management server 0103 is illustrated in FIG. 8 as in the first embodiment. Therefore, the description will not be repeated.

<Resource Performance Table, Logical Volume Management Table, Path Management Table, and Pool Management Table>

Examples of configuration of the resource performance table 0900, the logical volume management table 1000, the path management table 1100, and the pool management table 1200 are shown in FIGS. 10 to 12 as in the first embodiment.

Therefore, the description will not be repeated. However, the controller storage device 0101 is reread as the server 2001 in FIGS. 10 to 12.

<Virtual Machine Storage Area Management Table>

The virtual machine storage area management table stores information for managing the areas that store the virtual machines, and the example of configuration of the table can be expressed by the virtual logical volume management table 1300. However, in FIG. 13, the storage A (controller storage device 0101) is reread as the server 2001. The virtual logical volumes are reread as the virtual machine storage areas. The storage location storage device ID 1304 stores the identification information of the externally connected storage device 0102 that provides the logical volumes or the identification information of the server 2001.

<Summary of Overall Processing of Computer System>

The virtual logical volumes are reread as the virtual machine storage areas in FIG. 16 and the description of FIG. 16. The controller storage device 0101 is reread as the server 2001.

<Details of Information Acquisition Process>

In FIG. 17, the process of step S1701 is repeatedly executed for each externally connected storage device 0102 and server 2001. As described above, the virtual logical volumes are reread as the virtual machine storage areas.

<Details of Optimization Process>

The controller storage device 0101 is reread as the server 2001 in FIG. 18 and the description of FIG. 18. The storage control program 0114 is reread as the virtual machine control program 2014. The virtual logical volumes are reread as the virtual machine storage areas. The storage device ID 1303 of the virtual machine storage area management table stores information for identifying the server 2001.

<Configuration of GUI Screen>

In FIG. 19, the virtual logical volumes can be reread as the virtual machine storage areas.

Modified Examples

A logical volume management program capable of virtually constituting logical volumes across volumes allocated from a plurality of externally connected storage devices can be used as a scheme for expanding the second embodiment.

A file system capable of constituting a file system across a plurality of volumes can also be used.

The logical volume management program and the file system have functions equivalent to the functions of the virtual machine control program. In this case, the logical volume management program has similar functions as the functions of the virtual machine software.

In this way, the virtual machines of the server 2001 can be provided as a file system.

(3) Conclusion

In the embodiments, a management system (management server) manages configuration information of logical volumes allocated to virtual instances (equivalent to virtual logical volumes if the information processing apparatus is a controller storage device and equivalent to virtual servers if the information processing apparatus is a virtual server) managed on a virtual layer (equivalent to a storage pool if the information processing apparatus is a controller storage device and equivalent to virtual machine software (hypervisor) if the information processing apparatus is a server apparatus) of an information processing apparatus (for example, equivalent to a server apparatus that provides controller storage devices and virtual servers) and operation information of hardware resources included in externally connected storage devices. The management system evaluates (calculates) use efficiency of the virtual instances based on the configuration information of the logical volumes and the operation information of the hardware resources and outputs an evaluation result. In this way, the manager can determine whether the use efficiency of the currently operating virtual instances is good and can take measures if the efficiency is poor.

The management system takes into account access characteristic information (I/O characteristics) indicating access characteristics to the virtual instances to evaluate the use efficiency of the virtual instances. In this way, the access pattern indicated by the I/O characteristics is taken into account to evaluate the use efficiency of the virtual instances. Therefore, the use efficiency is evaluated not only by simply taking into account the load for the RAID group of the externally connected storage device, but also in accordance with the load in an externally connected storage device (load of the cache remaining capacity or the processor) when the access is based on a specific access method. In this way, the use efficiency can be accurately evaluated.

More specifically, the use efficiency of the virtual instances is evaluated by evaluating the responsivity to the I/O request of the storage subsystems and the load in the logical volumes associated with the virtual instances. The importance (weight coefficient) of the hardware resources included in the storage subsystems in the calculation of the evaluation is determined in accordance with the access characteristic information (access tendency) to evaluate the responsivity of the storage subsystems in the access characteristics. The load of disk drives of the storage subsystems that provide the logical volumes is further evaluated.

The management system outputs, as an evaluation result, an optimal logical volume (for example, GUI) that should be associated with the virtual instances. In this way, whether the logical volume associated with the virtual instances is optimal can be checked. If the optimal logical volume outputted as the evaluation result and a current logical volume allocated to the virtual instances are different, the management system may automatically, or in response to an inputted instruction, perform data migration to change the logical volume of an allocation destination. In this way, the virtual instances can use the optimal logical volume.

As described, a controller storage device can be used as the information processing apparatus. In this case, upper limit values and current values of the performance of various pieces of hardware in the computer system are collected. The load states of various pieces of hardware on the system are recognized to perform evaluation calculation to determine an optimal location as a storage location (logical volume of externally connected storage device) of data from the computer system, and the optimal storage location is outputted as an evaluation result. The optimal location is set to the controller storage device as necessary to control the storage location of data. As described, to determine the storage location of data, the location is selected based on past I/O characteristics and characteristics defined by the user (setting of access characteristics by the user). In this way, the performance information of the hardware of a plurality of externally connected storage devices in the computer system is actually acquired to reference how much room is in the performance of various pieces of hardware. Therefore, a storage location appropriate for arranging the data from the computer system can be determined while preventing the performance of the hardware from reaching the upper limit. The storage location can be selected in accordance with the hardware characteristics necessary for the data based on past operation states and input information of the user. Therefore, a storage location more optimal for the data can be selected from the computer system.

The present invention can be realized by a program code of software for realizing the functions of the embodiments. In that case, a storage medium recording the program code is provided to a system or an apparatus, and a computer (or CPU or MPU) of the system or the apparatus reads out the program code stored in the storage medium. In that case, the program code read out from the storage medium realizes the functions of the embodiments, and the program code and the storage medium storing the program code constitute the present invention. Examples of the storage medium for supplying the program code include a flexible disk, a CD-ROM, a DVD-ROM, a hard disk, an optical disk, a magneto-optical disk, a CD-R, a magnetic tape, a nonvolatile memory card, and a ROM.

An OS (operating system) or the like operated on the computer may execute part or all of the actual processes based on an instruction of the program code, and the processes may realize the functions of the embodiments. A CPU or the like of the computer may execute part or all of the actual processes based on an instruction of the program code after the program code read out from the storage medium is written in a memory on the computer, and the processes may realize the functions of the embodiments.

The program code of the software for realizing the functions of the embodiments may be distributed through a network to store the program code in a storage section, such as a hard disk and a memory of a system or an apparatus, or in a storage medium, such as a CD-RW and a CD-R, and a computer (or CPU or MPU) of the system or the apparatus may read out the program code stored in the storage section or the storage medium upon use to execute the program code.

Lastly, it needs to be understood that the processes and the techniques described herein are essentially not related to any specific apparatuses but can be implemented by any suitable combinations of the components. Furthermore, various types of general-purpose devices can be used in accordance with the teaching described herein. It may be understood that construction of a dedicated apparatus may be beneficial to execute steps of the methods described herein. Appropriate combinations of a plurality of constituent elements disclosed in the embodiments can form various inventions. For example, some constituent elements may be deleted from all constituent elements illustrated in the embodiments. Furthermore, constituent elements across different embodiments may be appropriately combined. Although the present invention has been described in relation to specific examples, the specific examples are not for restrictions in any sense, but are for description. Those skilled in the art would understand that there are a multiplicity of combinations of hardware, software, and firmware suitable for carrying out the present invention. For example, the described software can be implemented by a wide range of programs or script languages, such as assembler, C/C++, perl, Shell, PHP, and JAVA (registered trademark).

In the embodiments, control lines and information lines considered necessary for the description are illustrated, and all control lines and information lines of the product may not be necessarily illustrated. All configurations may be connected to each other.

In addition, those with general knowledge of the technical field would recognize other implementations of the present invention from the examination of the disclosed description and embodiments of the present invention. Various modes and/or components of the described embodiments can be used individually or by any combinations in a computerized storage system with a function of managing data. The description and the specific examples are only typical ones, and the scope and the spirit of the present invention are illustrated in the following claims.

REFERENCE SIGNS LIST

0100 . . . computer system
0101 . . . controller storage device
0102 . . . externally connected storage device
0103 . . . management server
0104 . . . SAN switch
0106 . . . LAN
0107 . . . host
0111, 0121, 0131, 0171, 2011 . . . CPUs
0112, 0122, 0172, 0132, 2012 . . . memories
0113, 0123, 0133, 0175, 2013 . . . auxiliary storage devices
0114, 0124 . . . storage control programs
0134, 0801 . . . arrangement location management programs
0201 . . . RAID group
0202, 0203 . . . logical volumes
0204 . . . storage pool
0205 . . . virtual logical volume
0206 . . . page
0300 . . . RAID group management table
0400 . . . volume management table
0500 . . . storage pool configuration table
0600 . . . page configuration table
0700 . . . performance information table
0811 . . . information collection program
0812 . . . arrangement location optimization program
0813 . . . arrangement location information input/output program
0900 . . . resource performance table
1000 . . . logical volume management table
1100 . . . path management table
1200 . . . pool management table
1300 . . . virtual logical volume management table
1400 . . . port management table
1900 . . . GUI screen
2001 . . . server
2014 . . . virtual machine control program

The invention claimed is:

1. A management system that manages a plurality of storage subsystems and an information processing apparatus coupled to the storage subsystems and including a virtual layer for virtually providing information from the storage subsystems, the management system comprising:
   a memory that stores configuration information of logical volumes allocated to virtual instances managed on the virtual layer of the information processing apparatus and operation information of shared hardware resources included in the storage subsystems; and
   a processor that evaluates use efficiency of the virtual instances based on the configuration information of the logical volumes and the operation information of the shared hardware resources and that outputs an evaluation result of evaluation values of the shared hardware resources;
the management system configured to:
   (A) from first storage subsystems, acquire correspondence information between a first logical volume and hardware resources, and performance information about the hardware resources;

(B) from second storage subsystems, acquire correspondence information between pages and first and second logical volumes;
(C) from the second storage subsystems or GUI screen of the management system, acquire access characteristics of a virtual logical volume;
(D) based on the information acquired by (A) and (C), determine correspondences between the pages and the first and second logical volumes,
wherein the second storage subsystem migrate data of the pages between the first and second logical volumes according to determined correspondences,
wherein the hardware resources further include a cache, and the performance information includes a capacity of the cache and performance of the cache, and
wherein the process (D) further considers a cache utilization of the each first storage subsystem, and a sequential random access ratio respecting address space of the virtual logical volume; and
wherein according to the process (D), if the sequential random ratio is high, the pages are migrated to a first storage subsystem about which the cache utilization is low, and wherein according to the process (D), if the sequential random ratio is low, the pages are migrated to a first storage subsystem about which the cache utilization is high.

2. A management system according to claim 1, wherein the memory further stores access characteristic information indicating access characteristics to the virtual instances, and
the processor takes the access characteristic information into account to evaluate the use efficiency of the virtual instances.

3. A management system according to claim 2, wherein the processor evaluates responsivity to an I/O request of the storage subsystems and load in the logical volumes associated with the virtual instances to evaluate the use efficiency of the virtual instances.

4. A management system according to claim 3, wherein the access characteristic information indicates an access tendency to the virtual instances, and
the processor determines importance of the hardware resources included in the storage subsystems in the calculation of the evaluation in accordance with the access characteristic information to evaluate the responsivity of the storage subsystems in the access characteristics.

5. A management system according to claim 4, wherein the processor evaluates load of the disk drives of the storage subsystems that provide the logical volumes.

6. A management system according to claim 3, wherein the processor outputs an optimal logical volume that should be associated with the virtual instances as the evaluation result.

7. A management system according to claim 6, wherein the processor automatically, or in response to an inputted instruction, performs data migration to change a logical volume of an allocation destination if the optimal logical volume outputted as the evaluation result is different from a current logical volume allocated to the virtual instances.

8. A management system according to claim 7, wherein the processor displays the evaluation result on a display screen of a display device as a GUI.

9. A management system according to claim 1, wherein the information processing apparatus is a controller storage subsystem that virtually provides the plurality of storage subsystems as the same storage subsystems,
the virtual instances are virtual volumes to which the logical volumes provided by the plurality of storage subsystems are allocated, and
the virtual layer is a pool arranged in the controller storage subsystem and associated with the virtual logical volumes.

10. A management system according to claim 1, wherein the information processing apparatus is a computer that provides a plurality of virtual servers that can access the plurality of storage subsystems,
the virtual instances are the virtual servers, and
the virtual layer is virtual machine software that manages the virtual servers.

11. A computer system comprising: a plurality of storage subsystems; an information processing apparatus coupled to the storage subsystems and including a virtual layer for virtually providing information from the storage subsystems; and the management system according to claim 1, wherein
the management system communicates with the plurality of storage subsystems and the information processing apparatus, acquires configuration information of the logical volumes allocated to the virtual instance and operation information of hardware resources included in the storage subsystems, and stores the information in the memory.

12. A method by a management system managing a plurality of storage subsystems and an information processing apparatus coupled to the storage subsystems and including a virtual layer for virtually providing information from the storage subsystems,
the management system comprising: a processor; and a memory that stores configuration information of logical volumes allocated to virtual instances managed on the virtual layer of the information processing apparatus, operation information of shared hardware resources included in the storage subsystems, and access characteristic information indicating access characteristics to the virtual instances,
the method comprising:
reading, by the processor, the configuration information of the logical volumes, the operation information of the shared hardware resources, and the access characteristic information from the memory;
evaluating, by the processor, use efficiency of the virtual instances based on the read configuration information of the logical volumes, the operation information of the shared hardware resources, and the access characteristic information; and
outputting, by the processor, an evaluation result of evaluation values of the shared hardware resources;
the management system configured to:
(A) from first storage subsystems, acquiring correspondence information between a first logical volume and hardware resources, and performance information about the hardware resources;
(B) from second storage subsystems, acquiring correspondence information between pages and first and second logical volumes;
(C) from the second storage subsystems or GUI screen of the management system, acquiring access characteristics of a virtual logical volume;
(D) based on the information acquired by (A) and (C), determining correspondences between the pages and the first and second logical volumes,
wherein the second storage subsystem migrating data of the pages between the first and second logical volumes according to determined correspondences, wherein the hardware resources further include a cache, and the performance information includes a capacity of the cache and performance of the cache, and wherein the process (D) further considering a cache utilization of the each first storage subsystem, and a sequential random access ratio respecting address space of the virtual logical volume; and wherein according to the process (D), if the sequential random ratio is high, the pages migrating to a first storage subsystem about which the cache utilization is low, and wherein according to the process (D), if the sequential random ratio is low, the pages migrating to a first storage subsystem about which the cache utilization is high.

13. A method according to claim 12, wherein in the evaluating, the processor evaluates responsivity to an I/O request of the storage subsystems and load in the logical volumes associated with the virtual instances to evaluate the use efficiency of the virtual instances.

14. A method according to claim 13, wherein the access characteristic information indicates an access tendency to the virtual instances, and in the evaluating, the processor determines importance of the hardware resources included in the storage subsystems in the calculation of the evaluation in accordance with the access characteristic information to evaluate the responsivity of the storage subsystems in the access characteristics.

15. A method according to claim 14, wherein in the evaluating, the processor evaluates load of the disk drives of the storage subsystems that provide the logical volumes.

16. A computer system comprising:

a host computer;

a plurality of first storage subsystems, each including hardware resources at least including first RAID groups, wherein the each first storage subsystem provide a first logical volume using the hardware resources;

a second storage subsystem coupled to the host computer and including a second RAID group, wherein, to the host computer, the second storage subsystem defines a storage pool including the first logical volume and a second logical volume defined in the second RAID group, and provides a virtual logical volume separated into pages corresponding to the first and second logical volumes in the storage pool; and a management system configured to:

(A) from the first storage subsystems, acquire correspondence information between the first logical volume and the hardware resources, and performance information about the hardware resources;

(B) from the second storage subsystems, acquire correspondence information between the pages and the first and second logical volumes;

(C) from the second storage subsystems or GUI screen of the management system, acquire access characteristics of the virtual logical volume;

(D) based on the information acquired by (A) and (C), determine correspondences between the pages and the first and second logical volumes, and wherein the second storage subsystem migrate data of the pages between the first and second logical volumes according to the determined correspondences, wherein the hardware resources further include a cache, and the performance information includes a capacity of the cache and performance of the cache, wherein the process (D) further considers a cache utilization of the each first storage subsystem, and a sequential random access ratio respecting the address space of the virtual logical volume, and wherein according to the process (D), if the sequential random ratio is high, the pages are migrated to a first storage subsystem about which the cache utilization is low, and wherein according to the process (D), if the sequential random ratio is low, the pages are migrated to a first storage subsystem about which the cache utilization is high.

17. A management system for a computer system having:

a host computer, a plurality of first storage subsystems, each including hardware resources at least including first RAID groups, wherein each first storage subsystem provides a first logical volume using the hardware resources, a second storage subsystem coupled to the host computer and including a second RAID group, wherein, to the host computer, the second storage subsystem defines a storage pool including the first logical volume and a second logical volume defined in the second RAID group, and provides a virtual logical volume separated into pages corresponding to the first and second logical volumes in the storage pool, the management system configured to:

(A) from the first storage subsystems, acquire correspondence information between the first logical volume and the hardware resources, and performance information about the hardware resources;

(B) from the second storage subsystems, acquire correspondence information between the pages and the first and second logical volumes;

(C) from the second storage subsystems or GUI screen of the management system, acquire access characteristics of the virtual logical volume;

(D) based on the information acquired by (A) and (C), determine correspondences between the pages and the first and second logical volumes, and wherein the second storage subsystem migrate data of the pages between the first and second logical volumes according to the determined correspondences, wherein the hardware resources further include a cache, and the performance information includes a capacity of the cache and performance of the cache, wherein the process (D) further considers a cache utilization of the each first storage subsystem, and a sequential random access ratio respecting the address space of the virtual logical volume, and wherein according to the process (D), if the sequential random ratio is high, the pages are migrated to a first storage subsystem about which the cache utilization is low, and wherein according to the process (D), if the sequential random ratio is low, the pages are migrated to a first storage subsystem about which the cache utilization is high.

* * * * *